(12) United States Patent
Schmidt et al.

(10) Patent No.: US 7,696,938 B2
(45) Date of Patent: Apr. 13, 2010

(54) ANTENNA SYSTEM, PARTICULARLY FOR RADAR APPLICATIONS IN MOTOR VEHICLES

(75) Inventors: Ewald Schmidt, Ludwigsburg (DE); Klaus Voigtländer, Wangen (DE)

(73) Assignee: Robert Bosch GmbH, Stuttgart (DE)

( * ) Notice: Subject to any disclaimer, the term of this patent is extended or adjusted under 35 U.S.C. 154(b) by 673 days.

(21) Appl. No.: 10/577,378

(22) PCT Filed: Sep. 10, 2004

(86) PCT No.: PCT/EP2004/052129

§ 371 (c)(1), (2), (4) Date: Apr. 9, 2007

(87) PCT Pub. No.: WO2005/043675

PCT Pub. Date: May 12, 2005

(65) Prior Publication Data

US 2007/0216587 A1    Sep. 20, 2007

(30) Foreign Application Priority Data

Oct. 27, 2003    (DE) ................ 103 50 034

(51) Int. Cl.
*H01Q 1/32* (2006.01)
(52) U.S. Cl. .................................... 343/711
(58) Field of Classification Search .......... 343/711–714
See application file for complete search history.

(56) References Cited

U.S. PATENT DOCUMENTS 5,343,214 A * 8/1994 Hadzoglou ............. 343/713
5,438,697 A * 8/1995 Fowler et al. ........... 455/347
5,515,064 A * 5/1996 Bacnik et al. ........... 343/860
5,526,003 A * 6/1996 Ogawa et al. ...... 343/700 MS
6,307,515 B1 * 10/2001 Sauer et al. ............ 343/713
6,608,597 B1 * 8/2003 Hadzoglou et al. ...... 343/713
2006/0038227 A1 * 2/2006 Aitken et al. ........... 257/347

FOREIGN PATENT DOCUMENTS

| EP | 0 660 135 | 6/1995 |
|----|-----------|--------|
| EP | 0 858 126 | 8/1998 |
| EP | 0 866 517 | 9/1998 |
| EP | 1 152 485 | 11/2001 |
| EP | 1 289 052 | 3/2003 |
| JP | 11-74723  | 7/1989 |
| JP | 3-101507  | 4/1991 |
| JP | 7-321543  | 12/1995 |
| JP | 9-83240   | 3/1997 |
| JP | 10-270936 | 10/1998 |
| JP | 2000 228608 | 8/2000 |

(Continued)

*Primary Examiner*—Huedung Mancuso
(74) *Attorney, Agent, or Firm*—Kenyon & Kenyon LLP

(57) ABSTRACT

In an antenna system, an antenna feeding substrate is connected by its conductor structures via field coupling to planar antenna radiating elements. A mounting part, able to be fixed in position against the antenna feeding substrate, is provided for the antenna radiating elements. The mounting part itself or a housing part able to be joined to it with form locking is used for the HF shielding of the antenna feeding substrate. The mounting part and/or housing part are structured in such a way that, viewed from the planar antenna radiating elements in the radiation direction, a wave guidance is achieved.

21 Claims, 23 Drawing Sheets

FOREIGN PATENT DOCUMENTS

| | | |
|---|---|---|
| JP | 2001 177332 | 6/2001 |
| JP | 2001-292016 | 10/2001 |
| WO | 00 45462 | 8/2000 |
| WO | 01 03243 | 1/2001 |
| WO | 02 50952 | 6/2002 |
| WO | 03 041220 | 5/2003 |
| WO | WO 03/041222 | 5/2003 |

* cited by examiner

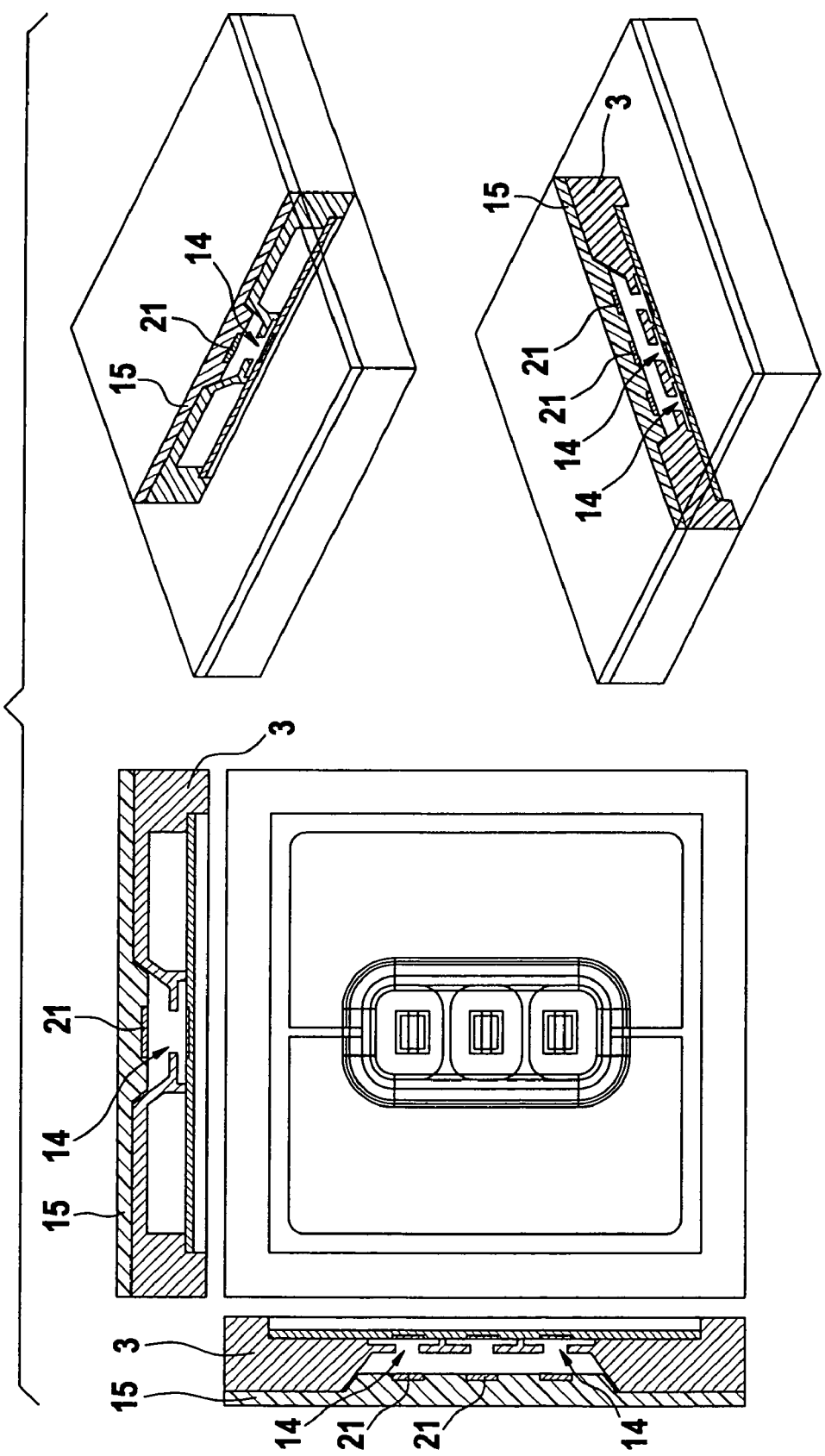

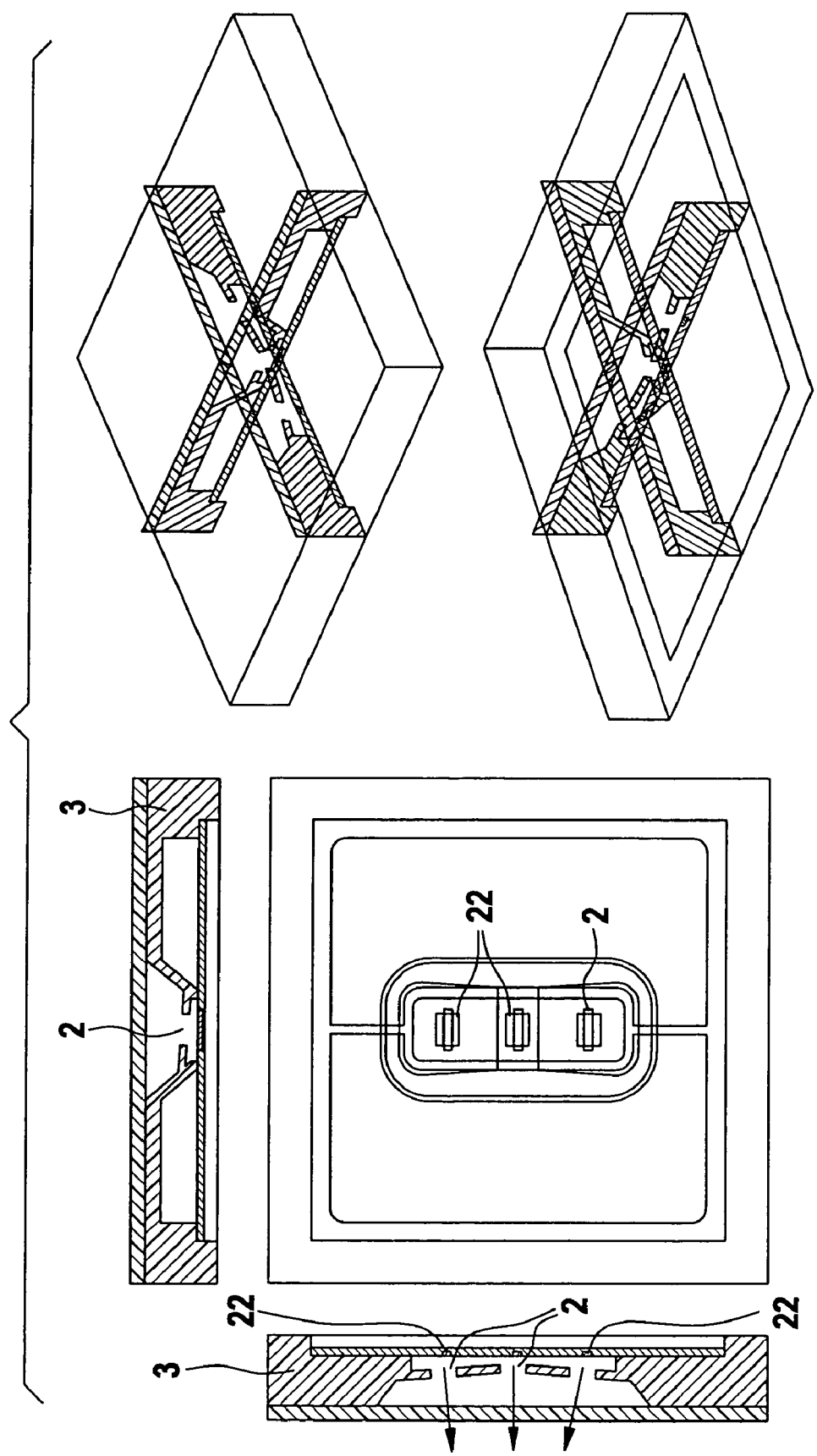

ANTENNA SYSTEM, PARTICULARLY FOR RADAR APPLICATIONS IN MOTOR VEHICLES

FIELD OF THE INVENTION

Various planar antenna systems are familiar as antenna radiating elements having one or more conductive, radiation-capable areas (single patch or patch array) on dielectric substrate materials (patch antennas, microstrip antennas).

BACKGROUND INFORMATION

These patches are fed either directly via contacted lines, e.g., microstrip lines at the edge, or through the substrate via feedthroughs into the patch area or within the multilayer substrate having a suitable layout via field coupling. Additional elements like a "superstrate" (planar dielectric plate at a certain distance to the patches) or a "polyrod" are used to attain a narrower antenna lobe characteristic.

The antennas are covered with a radome as mechanical protection against the environment (rain, snow, dirt, rockfall, ... ). In special cases, the function of the superstrate is integrated into the radome by suitable geometry and material selection.

Complementary systems are also familiar, in which in the layout, the patches are metal-free, and the surrounding area is conductive.

SUMMARY OF THE INVENTION

Using the present invention, which involves an antenna feeding substrate having conductor structures for field coupling to one or more planar antenna radiating elements, a mounting part for the planar antenna radiating element(s) that is able to be fixed in position against the antenna feeding substrate—the mounting part itself or a housing part able to be joined to it with form locking in particular, being provided for the HF-shielding of the antenna feeding substrate, and the mounting part and/or the housing part being structured in such a way that, viewed from the planar antenna radiating element(s) in the radiation direction, a wave guidance is achieved—an antenna system can be attained which is low-expenditure, ensures an advantageous decoupling, offsets manufacturing tolerances, exhibits low losses and a large bandwidth. The expenditure for assembling the overall system into which the antenna system is integrated can be minimized by the measures of the present invention.

Bars, which are suitable for forming HF compartments over the antenna feeding substrate, may be easily integrated into the housing part. This is used for the mutual decoupling of the planar antenna radiating elements (patches) or their signal feed, and other HF circuits on the same substrate.

The planar antenna radiating element(s) may be applied on one or both sides of a dielectric substrate. This eliminates the need for mounting the antenna radiating elements individually. The substrate, i.e., the individual antenna radiating elements, may advantageously be introduced into cut-outs in the mounting part, so that a defined distance to the antenna feeding substrate is ensured, even given manufacturing tolerances. The cut-outs may also be used advantageously for forming complementary planar antenna radiating elements (slot antennas). The field coupling between the antenna feeding substrate and the radiating elements may be optimized if the distance is selected to be less than one fourth the operating wavelength, preferably 0.02 to about 0.1 of the operating wavelength. The antenna radiating elements or the dielectric substrate may be easily mounted and fixed in position if, in the direction of the antenna feeding substrate, the housing part is provided with at least one opening whose bottom is preferably planar. If the transition from the bottom/end of the opening to the outside of the mounting part is horn-shaped or funnel-shaped, it is possible to achieve optimal wave guidance for the radiation, as well as optimal wave-impedance transformation from the radiating element to the free space.

A, in particular, metallic mounting part itself or a housing part may have a cover made of dielectric material that is formed and dimensioned in such a way that it may be used as a radome or superstrate. In the region of the openings, this outer cover may have projections which engage with form locking in the openings or, in the case of complementary, planar antenna radiating elements (slot antenna), penetrate the latter. This measure leads to a reduced volume or overall length compared to conventional patch antennas, which is advantageous especially in automotive applications in the region of the bumper.

If the mounting part is made of a dielectric material, it may be formed and dimensioned in such a way that it itself may be used as a radome or superstrate.

The planar antenna radiating element(s) may be embedded or injected into the dielectric mounting part. Alternatively, the planar antenna radiating element(s) may be embedded into a dielectric functional part which is insertable with form locking into the mounting part and/or the housing part, especially into its opening.

The mounting part may be furnished with snap-in locking elements for introducing and fixing the antenna radiating elements in position. This facilitates the mounting and the exchange of antenna radiating elements.

Desired antenna lobes may be set, or unwanted side lobes may be suppressed by way of different numbers of antenna radiating elements compared to associated coupling slots in the antenna feeding substrate, as well as different distances.

A stack arrangement, i.e., placing a plurality of antenna radiating elements one above the other, may easily be implemented by incorporating into the dielectric functional part or the radome.

By inclining the surface normals of at least two antenna radiating elements or inverse planar antenna radiating elements relative to each other, the radiation lobes may be optimized for desired antenna applications, as well.

Standard, planar antenna radiating elements (metallic platelets) may also be combined with inverse, planar radiating elements (slot antennas), in each case one type of planar antenna radiating elements being accommodated in another structure (mounting part, cover). The number and the distance may be varied here, as well.

BRIEF DESCRIPTION OF THE DRAWINGS

FIGS. 20 to 22 shows an antenna system having additional stack patches in the radome.

FIGS. 32 to 34 shows an antenna system having patches inclined relative to the plane of symmetry.

DETAILED DESCRIPTION

The present invention starts out from known, mutually insulated, planar, metallic antenna radiating elements (patches) that are positioned at a defined distance over an antenna feeding substrate and are fed by field coupling. In this context, the intervening space may be made either of air, which means the antenna radiating elements are mechanically retained outside of the patch area, or may be made of a plastic having a low dielectric constant (close to 1), which may be foamed.

Figure 1:
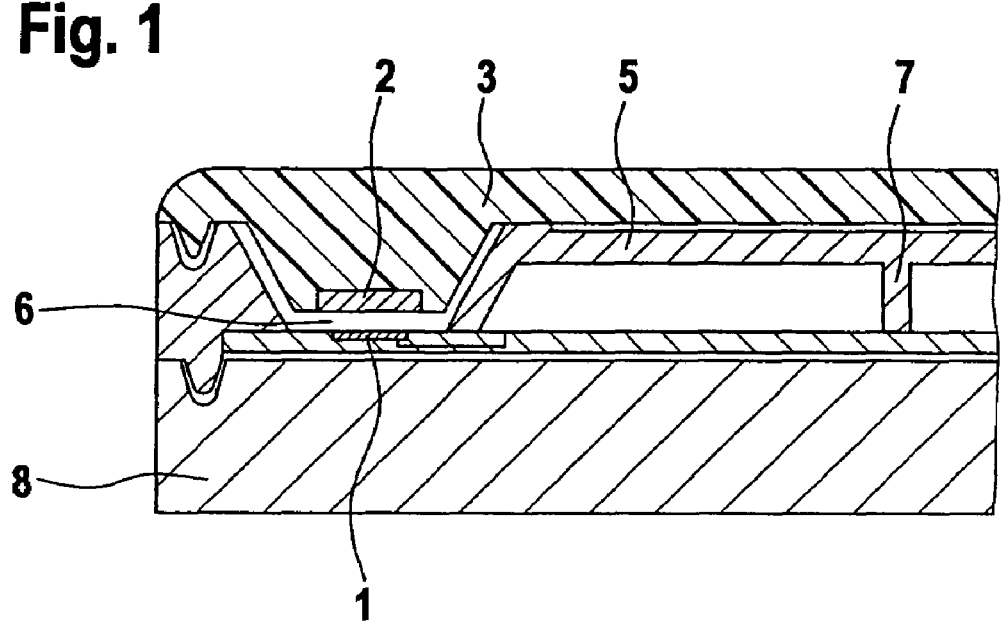
FIG. 1 shows a section through an antenna system having patches in a dielectric mounting part.

FIG. 1 shows a first construction of an antenna system according to the present invention in section. An antenna feeding substrate 1 is provided with suitable conductor structures for field coupling via air to one or more planar, metallic patches (antenna radiating elements) 2 arranged above it. Patches 2 are provided in a mounting part 3 made of plastic. The distance between feeding substrate 1 and a patch 2 is selected to be less than one fourth the operating wavelength, preferably 0.02 to about 0.1 of the operating wavelength. Preferably, patches 2 are captively injected at the same time during the production of plastic part 3 by injection molding, either in such a way that the metal platelets are completely extrusion coated, or in such a way that they are only partially surrounded above, below or at the edge by plastic. The lamina have at least a thickness as is necessary for producing the plastic/metal composite construction. The stack of patches is also easy to produce, preferably having two superposed patches at a distance up to approximately ¹/₁₀ the wavelength of the medium situated in between. The stacked patches may have the same or different sizes and geometries. In FIG. 1, a housing part 5 is provided which is situated between antenna feeding substrate 1 and mounting part 3. In the area of a patch 2, housing part 5 has an opening 6, into which mounting part 3 having patch 2 projects. In this embodiment variant, the end of opening 6 is open—thus represents an antenna cut-out—in order to achieve the field coupling between patch 2 and antenna feeding substrate 1. The transition of opening 6 from the end to the outside of housing part 5 is horn-shaped or funnel-shaped, in order to achieve a selective wave guidance in the radiation direction and, at the same time, to achieve an optimal wave-impedance transformation from patch 2 to the free space. Housing part 5 is conductive—e.g., is made of AL-pressure die-casting or metal-plated plastic injection molding. It may therefore serve as HF-shielding for antenna feeding substrate 1 situated under it.

For better decoupling of the signal feed to individual patches 2, housing part 5 is provided with bars 7. In this manner, HF-compartments are formed over the conducting structures of antenna feeding substrate 1, which prevent signal crosstalk to an arrangement in an adjacent compartment. A housing base 8 is located below antenna feeding substrate 1. Mounting part 3 and housing base 8 are joined with form locking to housing part 5, e.g., by screwing, clamping, adhesive bonding, etc. Mounting part 3 has a suitable geometry for accommodating the antenna feeding substrate and mounting part 3. In the case of an asymmetrical plastic patch part, the upper side or lower side may face antenna feeding substrate 1. The housing is formed in such a way that the distance between antenna feeding substrate 1 and patch 2 is defined over the entire periphery of mounting part 3. Given a suitably impervious construction, the plastic part may at the same time assume the function of the radome, thus eliminating the need for an additional cover.

Alternatively, conductive housing part 5 is not the accommodation of the complete antenna feeding substrate, but rather on its part, is applied so that it is positioned only partially on antenna feeding substrate 1. In this case, a further part is needed as housing.

Figure 2:
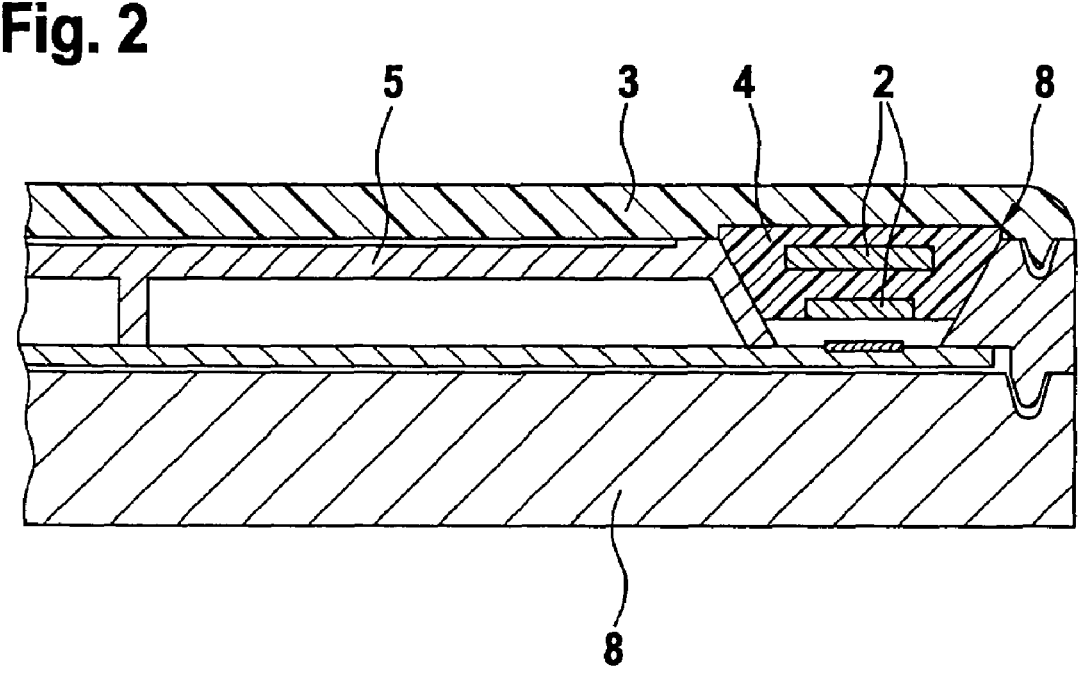
FIG. 2 shows a section through an antenna system having patches in a dielectric functional part.
Figure 3:
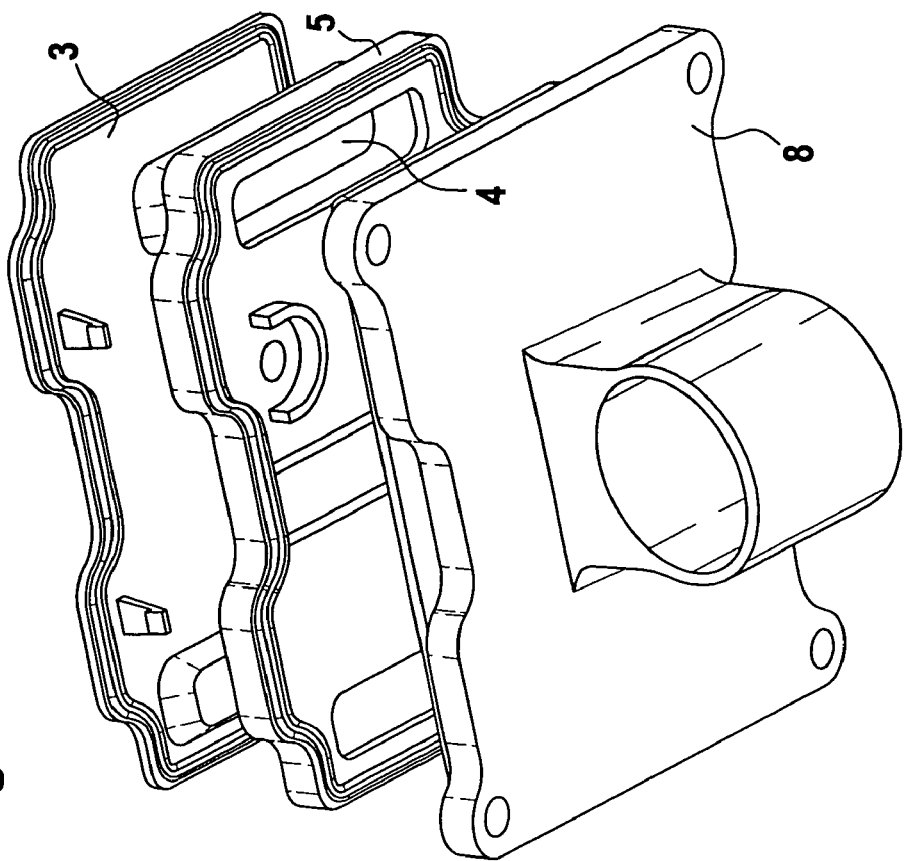
FIG. 3 shows an exploded view of an antenna system from above.
Figure 4:
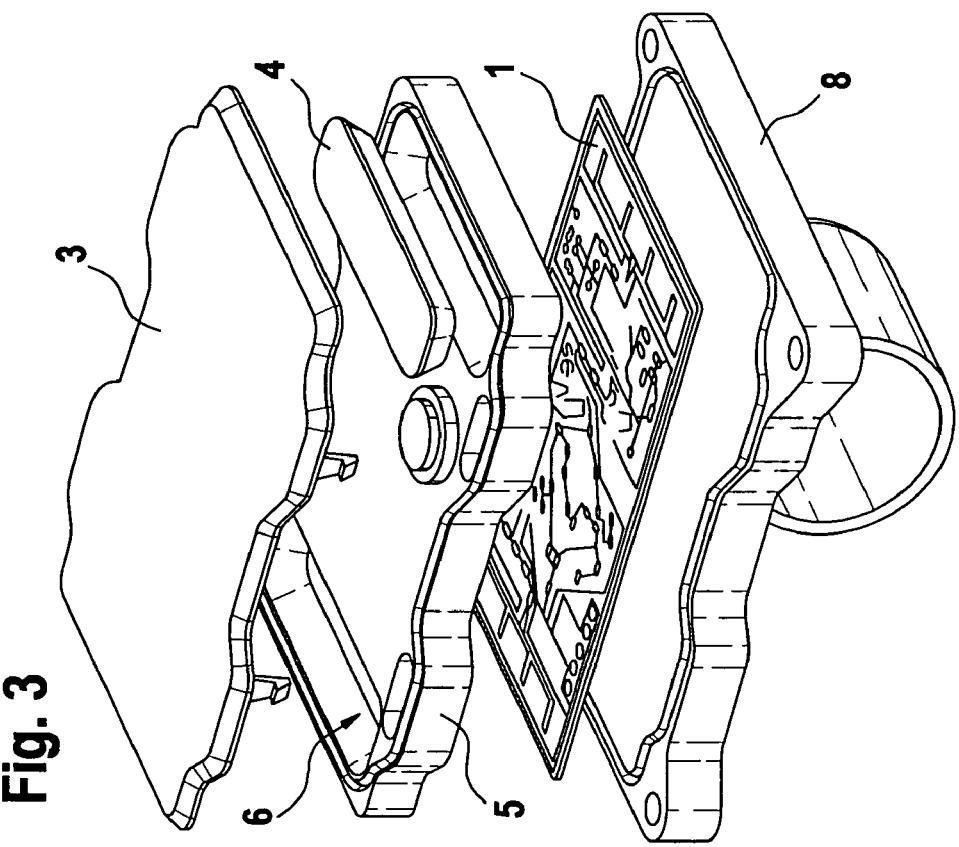
FIG. 4 shows an exploded view of an antenna system from below.

In the embodiment according to FIG. 2, the patches are embedded/injected into an additional functional part 4 made, for example, of plastic, which is inserted with form locking into housing part 5, especially into its funnel-shaped or horn-shaped opening 6. Mounting part 3 covers this functional part 4 and forms one unit with it. At the same time, it may be used as a radome. The mounting part preferably has a groove 8, into which functional part 4 is able to be pressed or cemented in place. FIG. 3 shows the two alternatives of FIGS. 1 and 2 in a perspective view from above, and FIG. 4 from below, the alternative of FIG. 1 being depicted on the left and the alternative of FIG. 2 on the right in one common unit. This common unit having the two alternatives is advantageous, for example, if the one alternative is used as a transmitting antenna, and the other alternative is used as a receiving antenna. For example, the alternatives may then be optimized precisely to the different antenna characteristics desired, e.g., narrow transmit characteristic and wide receive characteristic or vice versa.

Figure 5:
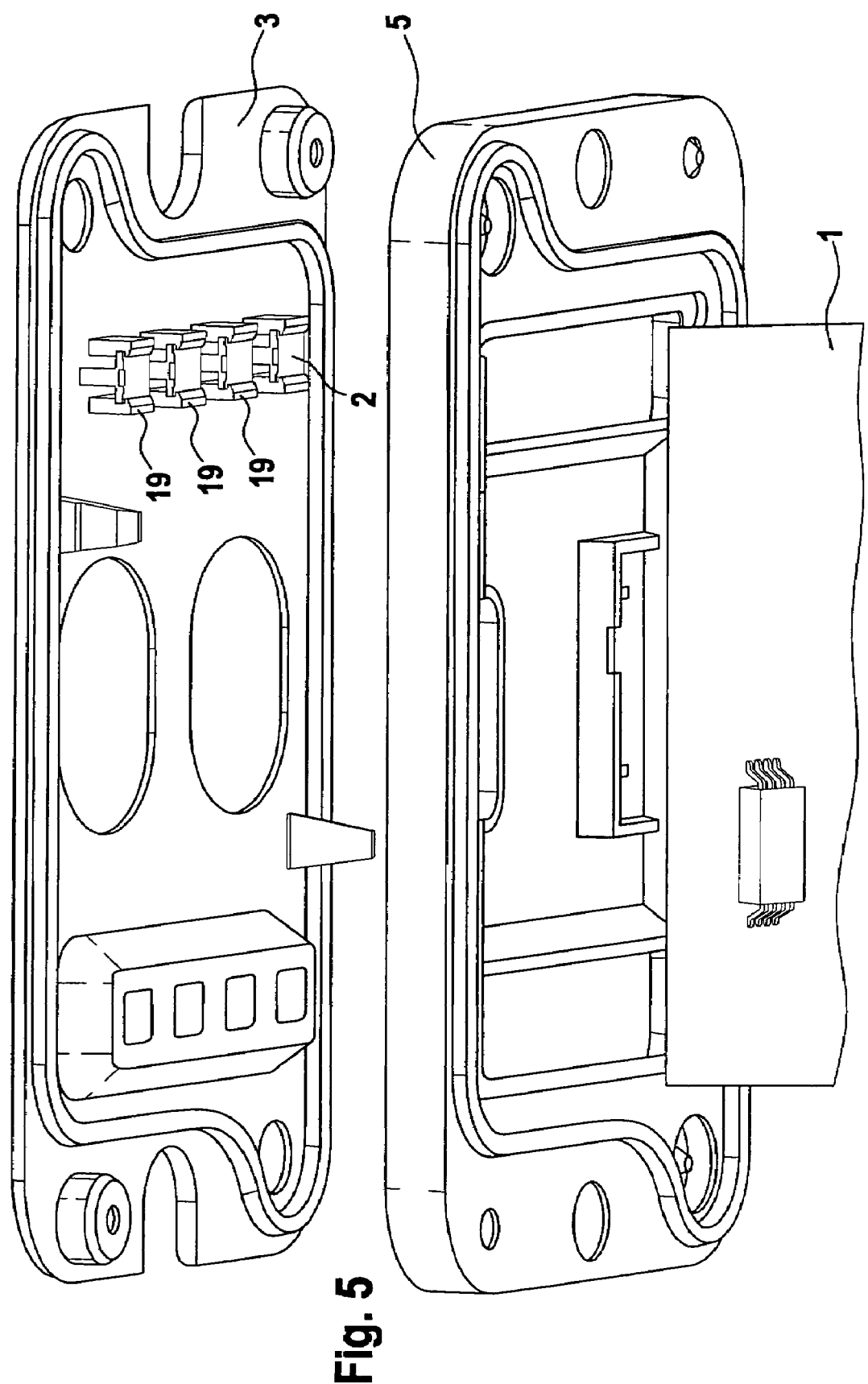
FIG. 5 shows an antenna system having patches injected or clipped into the radome.

FIG. 5 shows an alternative for incorporating patches 2 into mounting part 3. On its lower side, mounting part 3 has snap-in locking elements 19 for introducing and fixing/clipping antenna radiating elements (patches) 2 in position. These snap-in locking elements 19, together with patches 2, project through the antenna cut-outs of housing part 5, and after antenna feeding substrate 1 and mounting part 3 are fixed in position on housing part 5, are captively positioned over antenna feeding substrate 1.

Figure 6A:
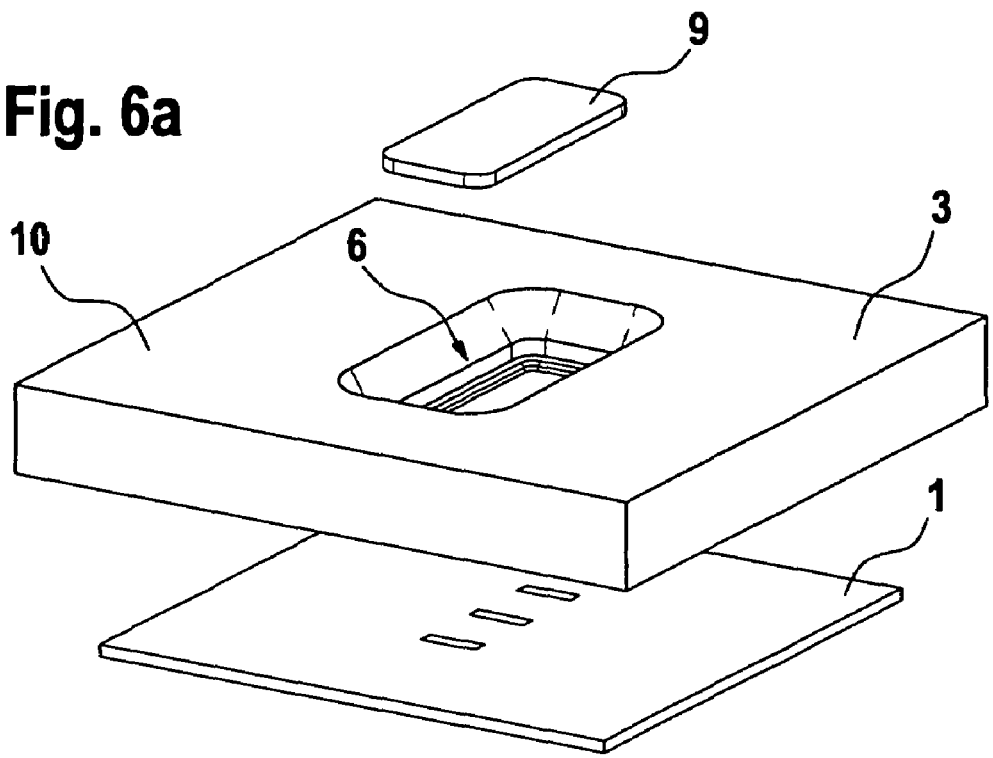
FIGS. 6 to 9 shows an antenna system having patches in a substrate for external mounting.
Figure 6B:
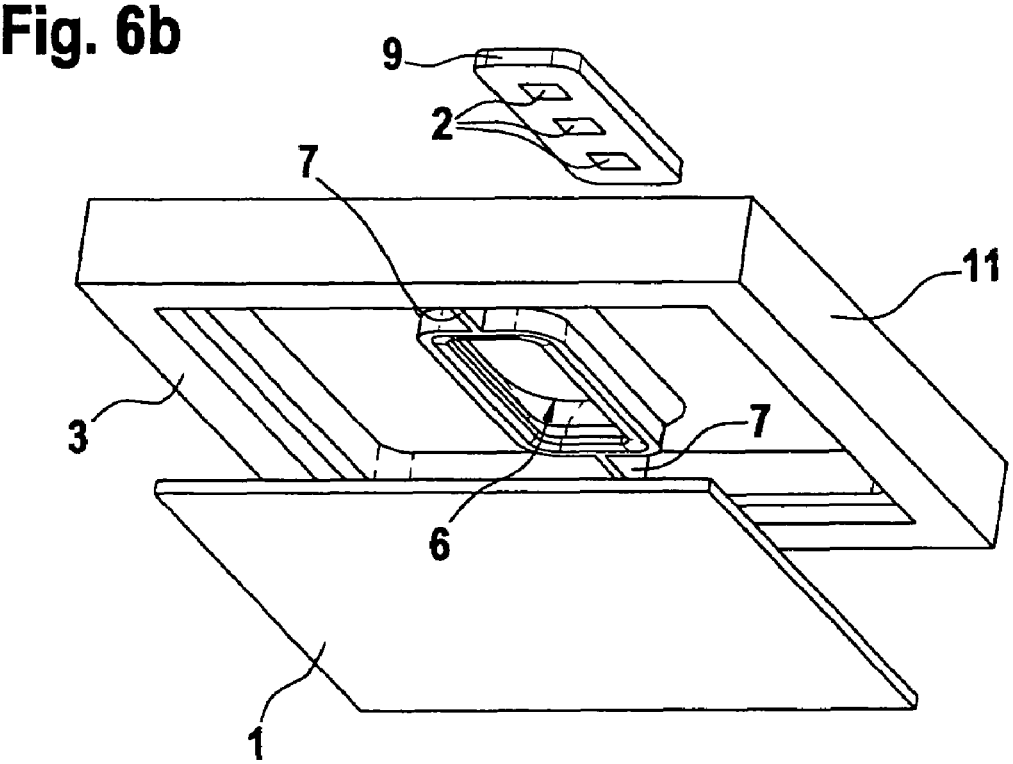

FIG. 6a in a perspective view, and FIG. 6b in a view from below, show an exemplary embodiment in which the antenna radiating elements, here three patches in one column, are applied on a dielectric printed circuit board substrate 9, on one or both substrate sides. If patches 2 are applied on both sides, they may also have different geometries (patch O and patch U). As before, antenna feeding substrate 1 is situated at a distance of 0.02 to approximately 0.1 of the operating wavelength from patches 2. As in the previous exemplary embodiments, mounting part 3 for dielectric substrate 9 having patches 2 is conductive, e.g., is made of AL-pressure die-casting or metal-plated plastic injection molding.

Mounting part 3 itself is used here as a housing part, as may be the case for other embodiment variants, as well, and is designed to be cup-shaped having an upper cover side 10 and a housing frame 11. In the region of substrate 9, mounting part 3 has an opening 6 in the direction of antenna feeding substrate 1, the end of this opening changing into a cut-out for the field coupling of antenna feeding substrate 1 with substrate 9 or its patches 2. The transition from the end/bottom of opening 6 toward cover side 10 is funnel-shaped or horn-shaped for the wave guidance in the radiation direction. In the exemplary embodiment of FIG. 6, substrate 9 is mounted from outside, i.e., is introduced into opening 6 up to its planar bottom and fixed in position there before it changes into the cut-out. In order to form HF compartments for shielding antenna feeding substrate 1, mounting part 3 has bars 7, each extending, for example, from housing frame 11 up to opening 6. The patch side of substrate 9 is mounted in defined manner facing or facing away from antenna feeding substrate 1, in FIG. 6, facing. Given a suitably impervious construction, substrate 9 may at the same time assume the function of the radome, thus eliminating the need for an additional cover. Alternatively, conductive mounting part 3 is not the accommodation of the complete antenna conductor substrate 1, but rather on its part, is applied so that it is positioned only partially on antenna feeding substrate 1. In this case, a further part is needed as housing.

Figure 8:
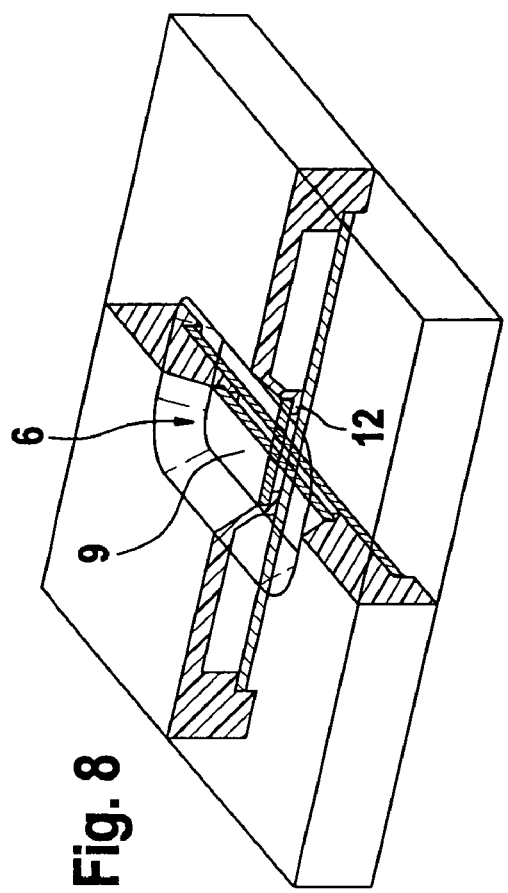
Figure 9:
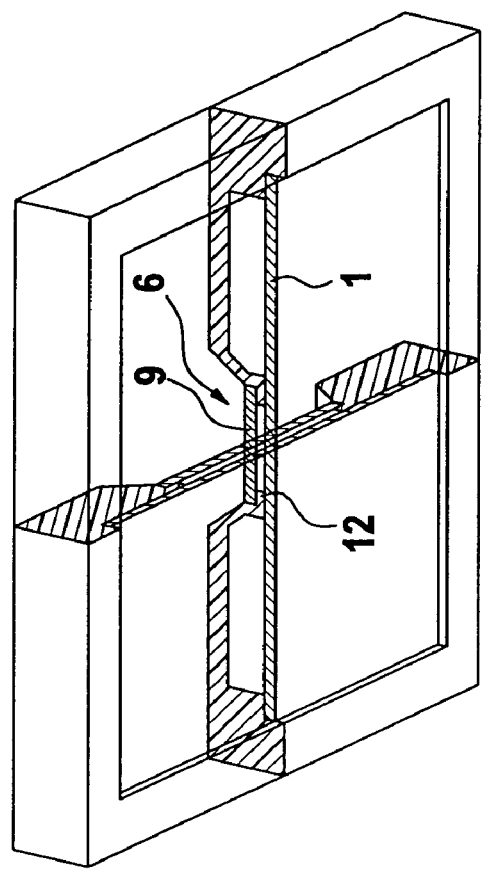
Figure 7:
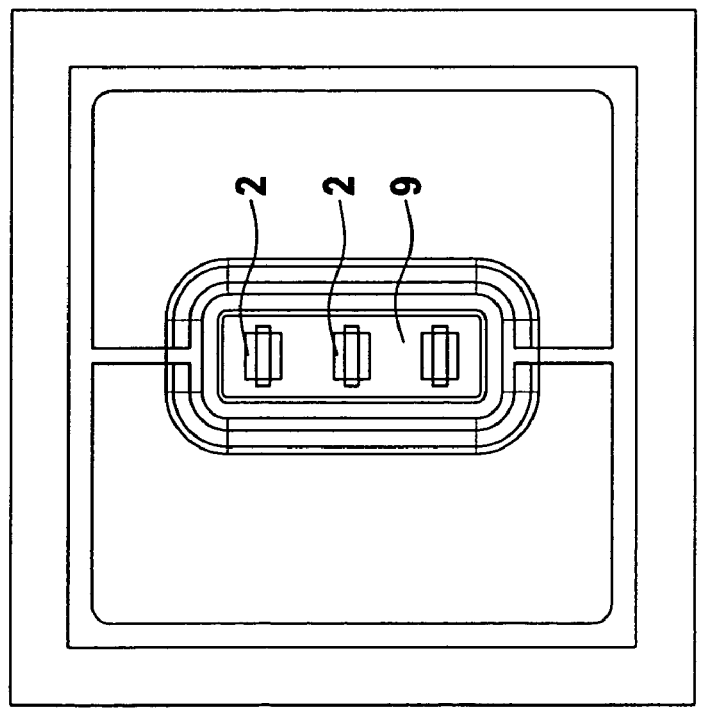
Figure 10:
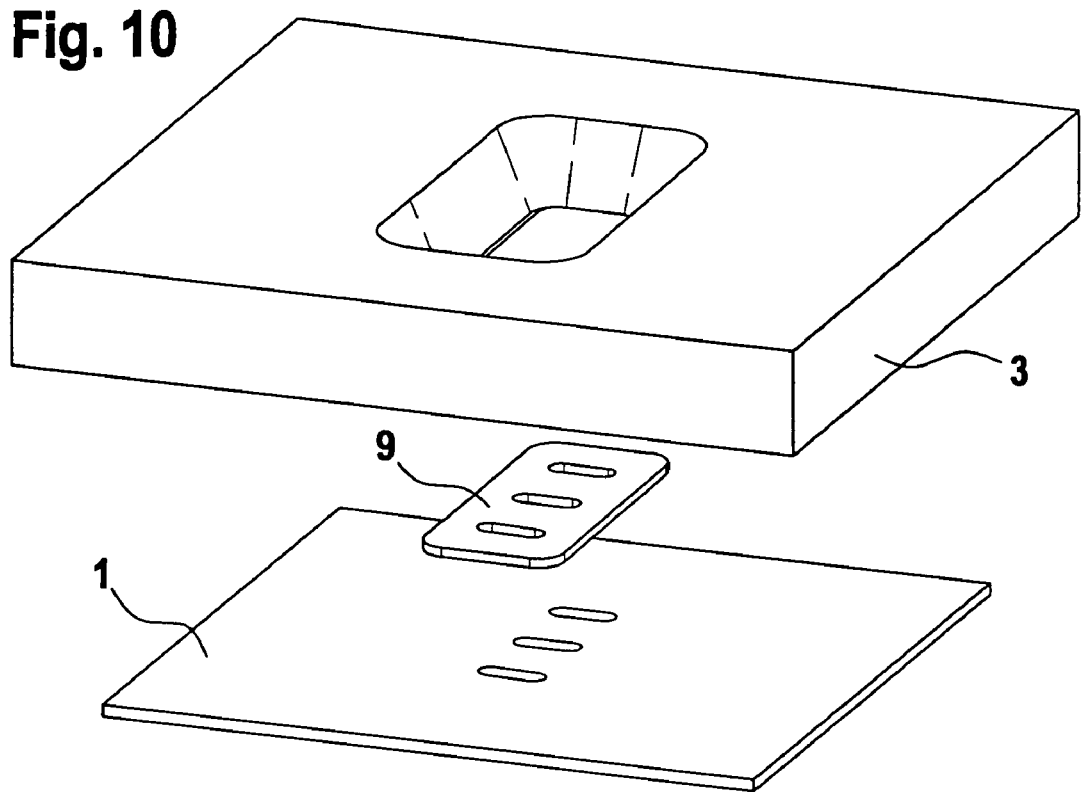
FIGS. 10 to 14 shows an antenna system having patches in a substrate for inner mounting.
Figure 11:
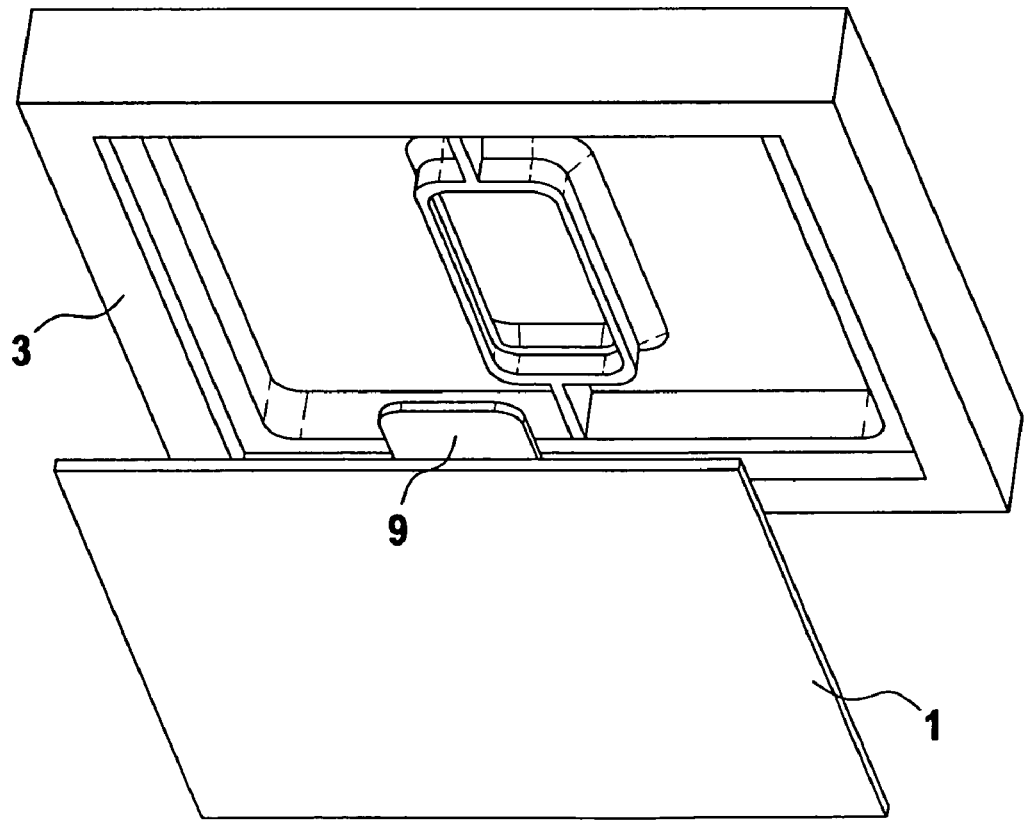
Figure 13:
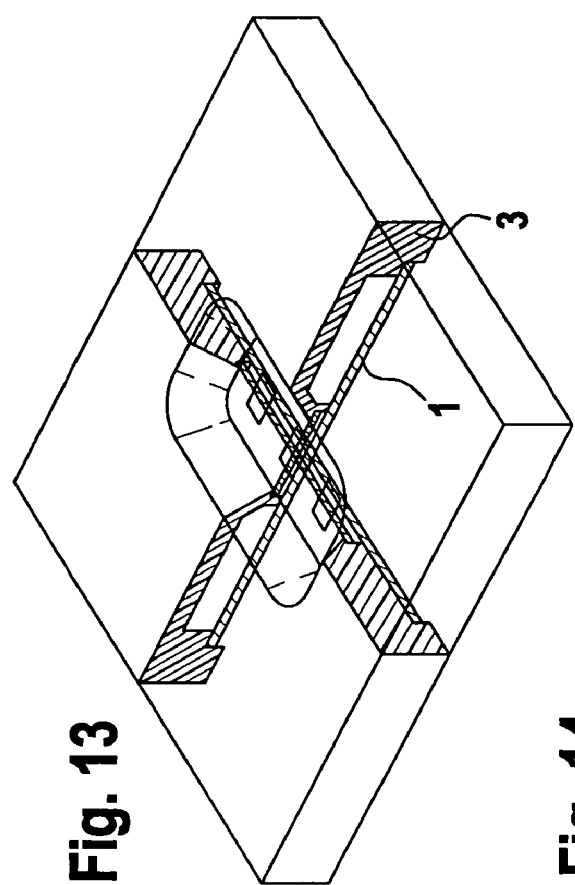
Figure 14:
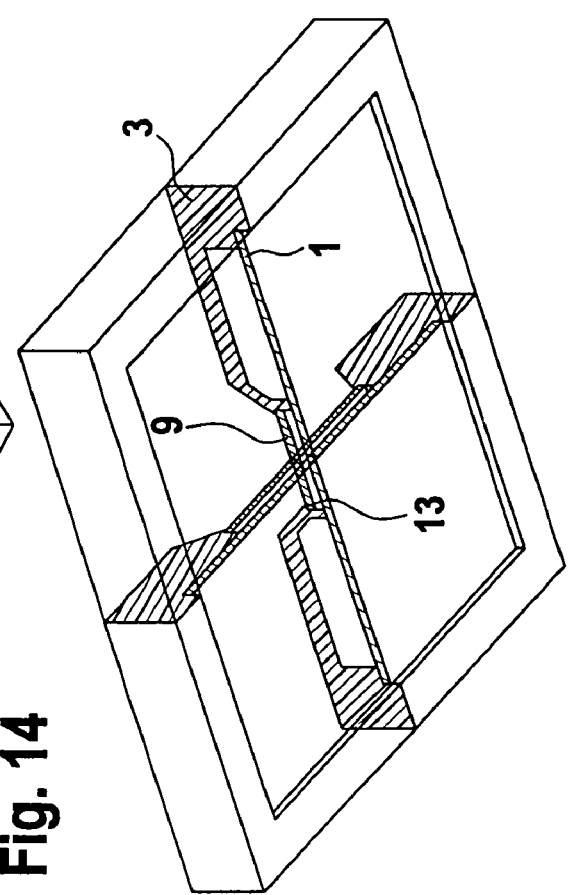
Figure 12:
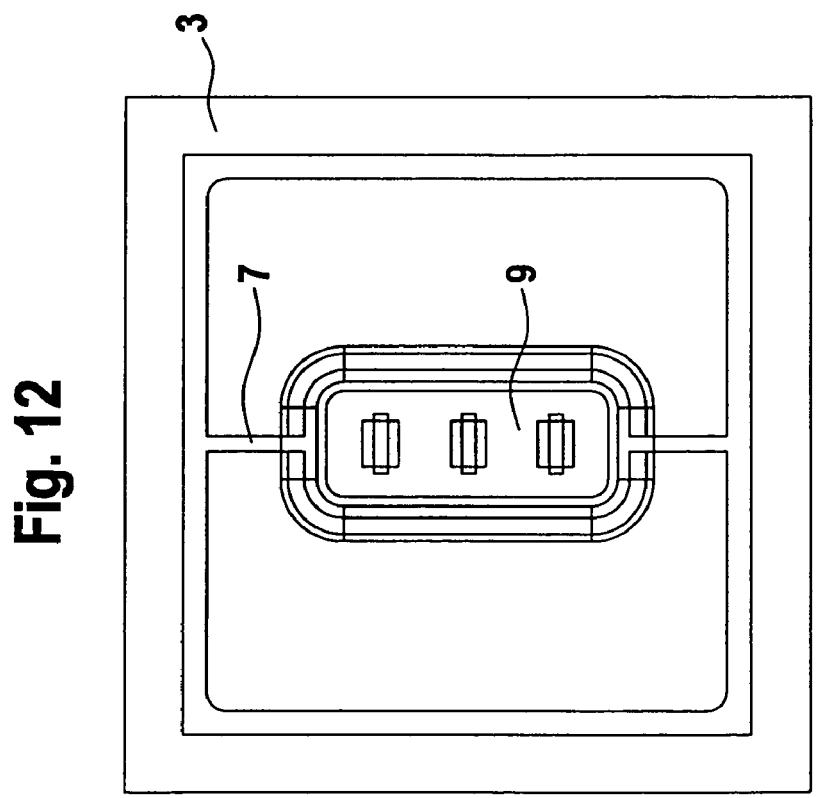

FIGS. 7, 8 and 9 show the external mounting in detail in a plan view and in section. Substrate 9 having patches 2 is situated at the end of opening 6 on a bead 12 which keeps it at a defined distance from antenna feeding substrate 1. In the case of the inner mounting according to FIGS. 10 through 14, substrate 9 is fixed in position from below against stop 13 of mounting part 3 in the region of opening 6, so that it has a defined distance to antenna feeding substrate 1 in this specific embodiment, as well.

Figure 16:
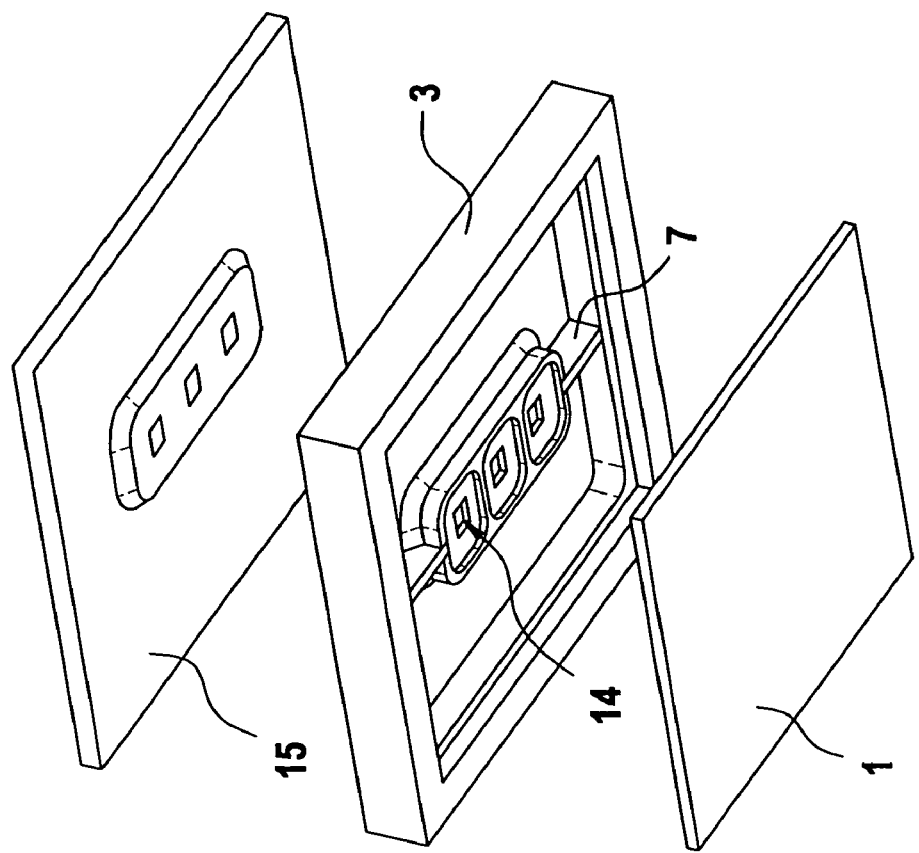
FIGS. 15 to 17 shows an antenna system having inverse patches.
Figure 15:
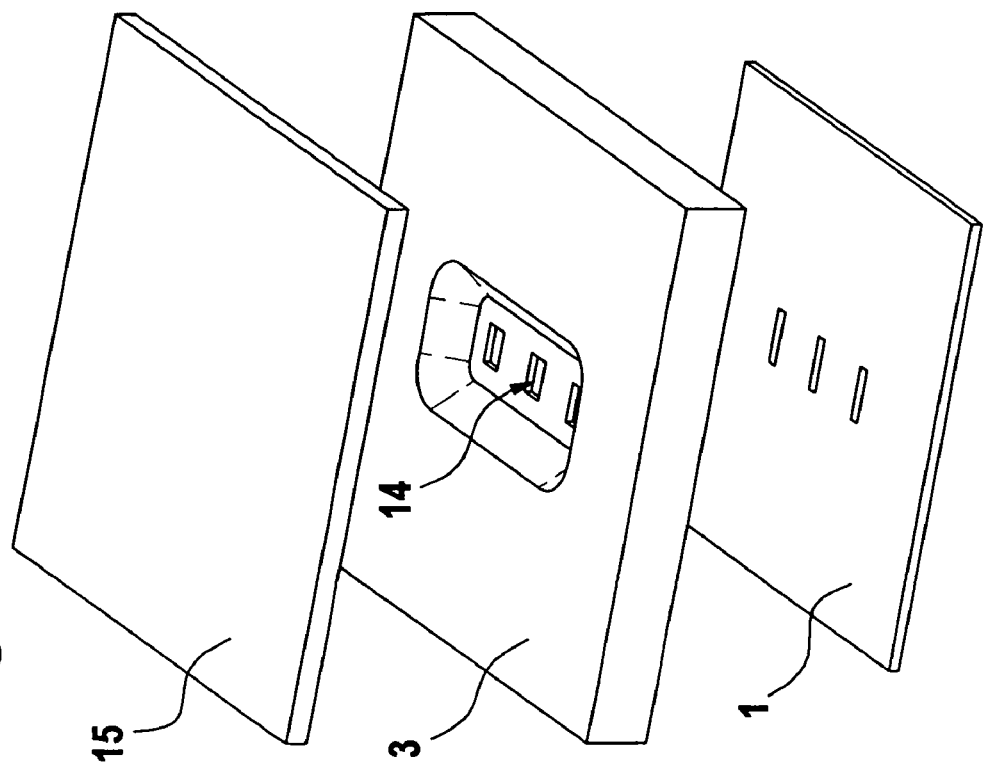
Figure 17:
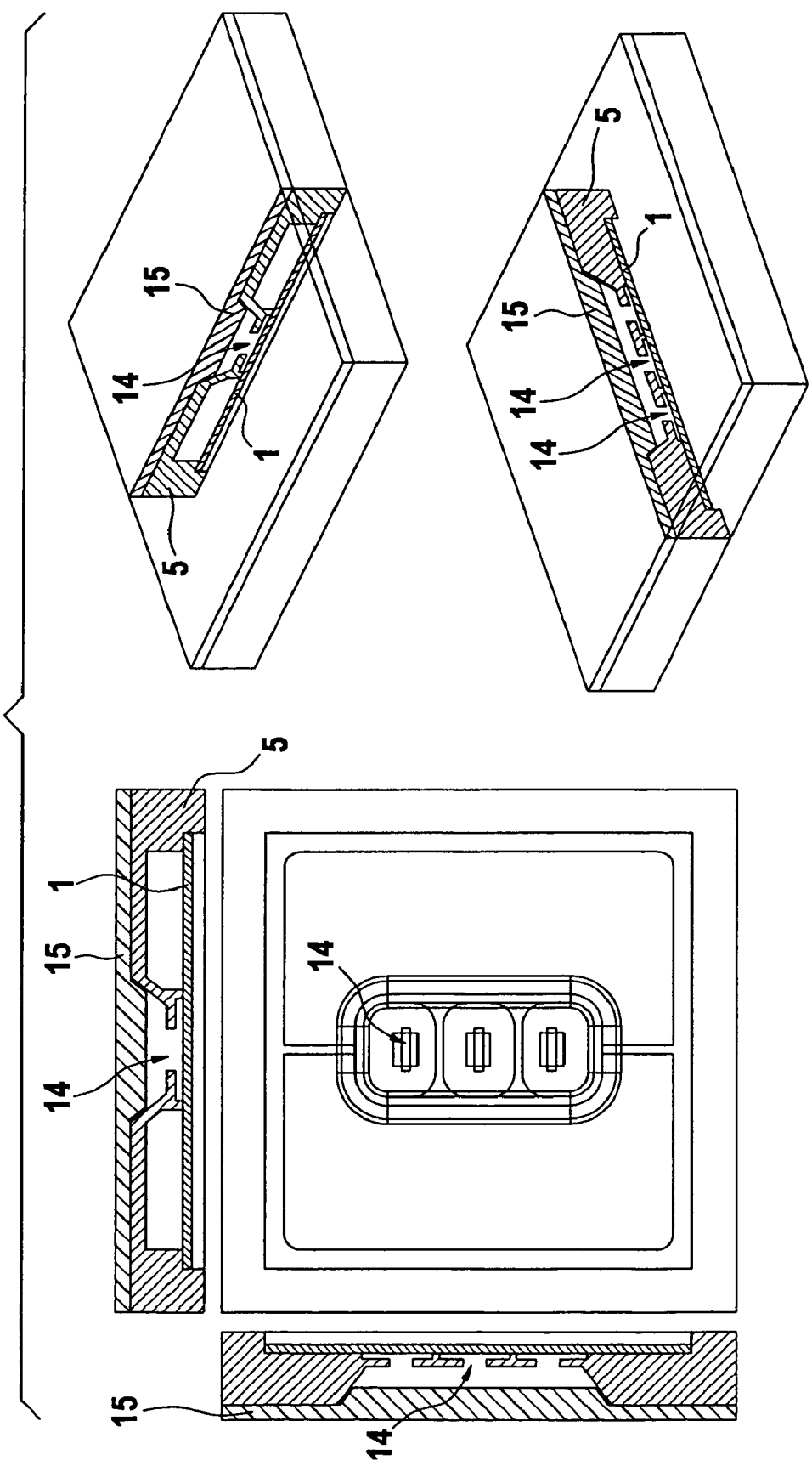

In the following, a complementary (inverse) planar antenna structure is described, which compared to complementary patch antennas with air clearance requires no special part with the inverse structures, since they are integrated into an already existing part. This leads to a costs reduction due to fewer parts and less tolerance dispersion (extra parts which are not present also have no tolerance). According to FIGS. 15 through 17, the antenna system having complementary structures is made up of an antenna feeding substrate 1 having suitable conductor structures for field coupling via air to one or more complementary patches. The distance of the patches to antenna feeding substrate 1 is less than one fourth the operating wavelength. Practical values are 0.02 to approximately 0.1 of the wavelength. Also provided is a conductive housing part/mounting part 3 having a suitable geometry for accommodating antenna feeding substrate 1. In the feeding area over substrate 1 in the continuation of the beam path, corresponding patch cut-outs 14 are provided that function as slot antennas. Cut-outs 14 have well-known patch shapes such as the rectangular shape shown. Below the patches, in the case of patch arrays, any feeding may be compartmentalized via bars 7, as implemented before. This compartment geometry is selected in such a way that very good adaptations result for the antenna at the operating frequencies. Antenna feeding substrate 1 is attached to the housing according to the methods such as screwing, adhesive bonding, clamping . . . described before.

Figure 18:
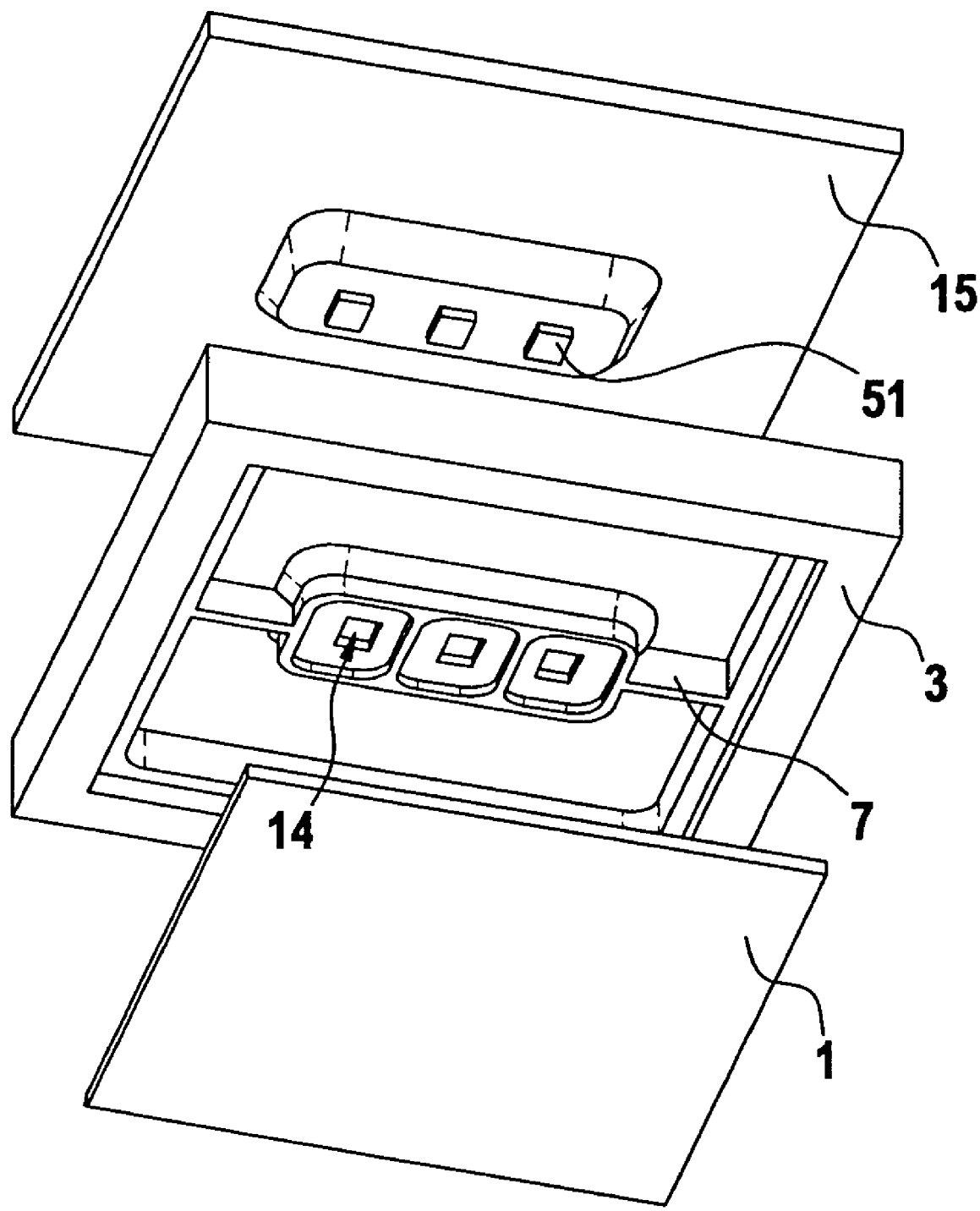
FIGS. 18 to 19 shows an antenna system having dielectric filling of the inverse patches.
Figure 19:
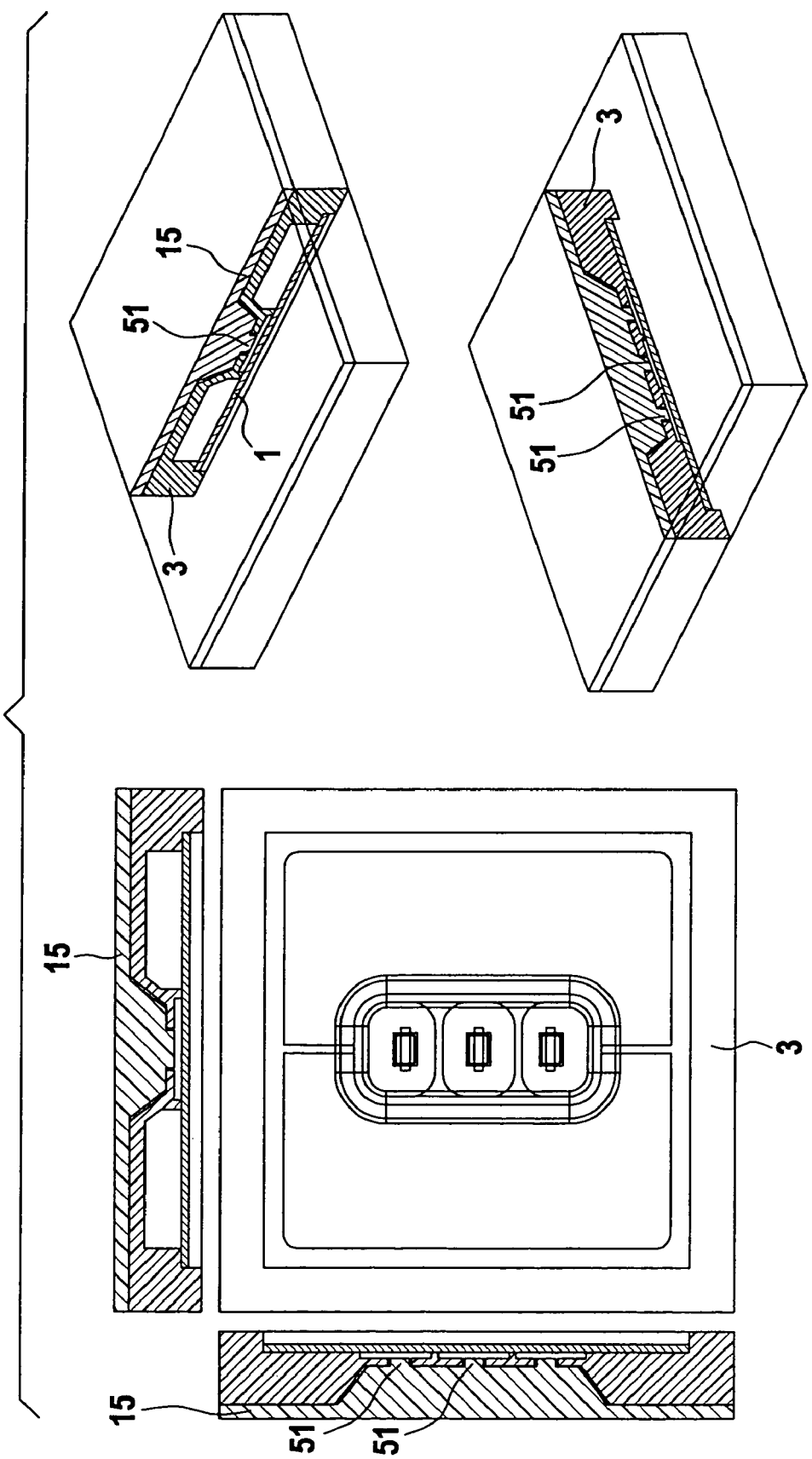
Figure 21:
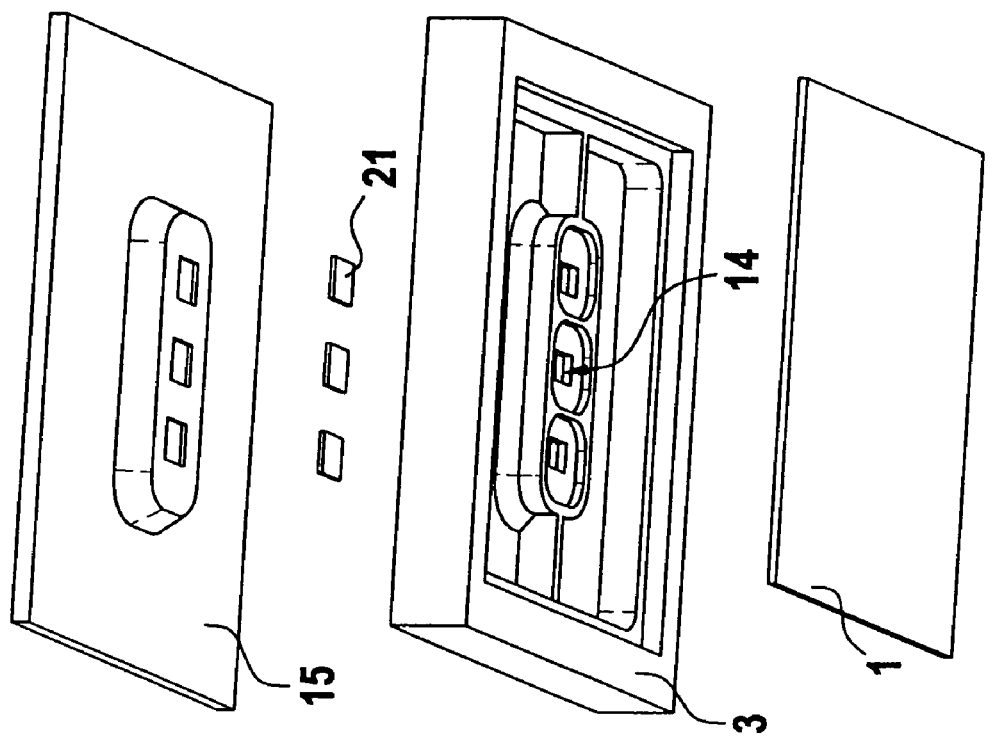
Figure 20:
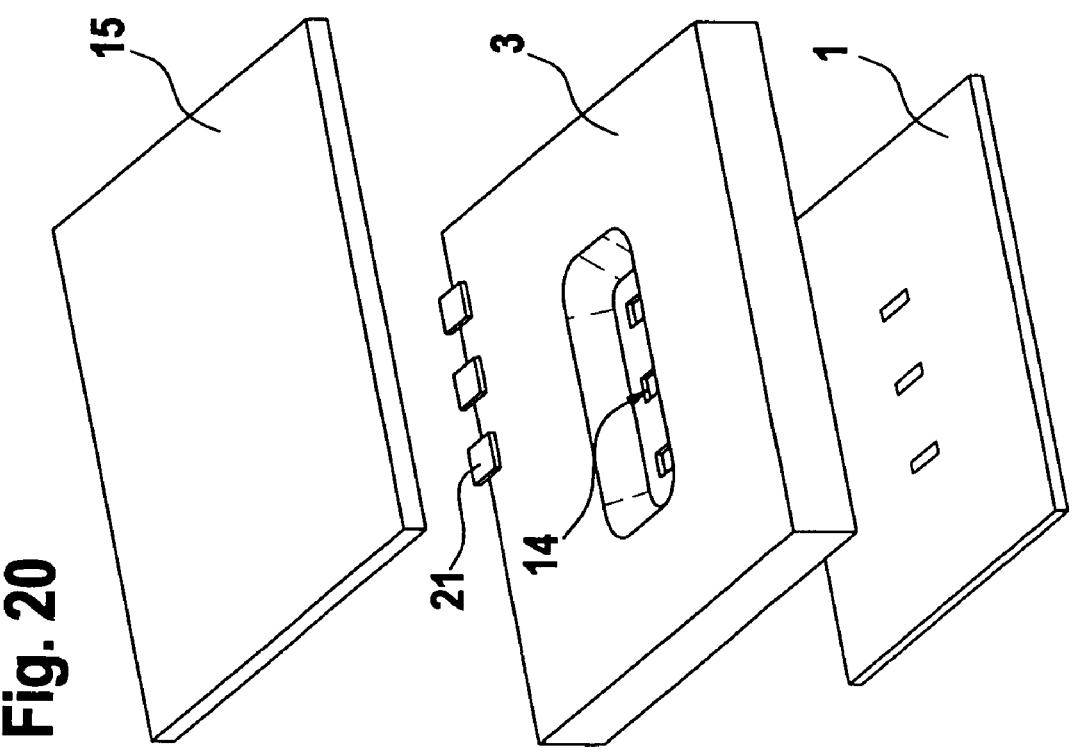

Variants and elaborations are described in the following:

The existing cover 15 of the system, made of a suitable dielectric material such as plastic or ceramics, is formed and dimensioned in such a way in the antenna area that radome properties are ensured. Preferably, the special forming is directed into the housing. This yields the smallest possible volume for the device. This is possible since compartments for HF circuits locally next to the antennas require a certain height, which is then available in the antenna area to the antennas themselves as usable volume. The existing cover 15 of the system, made of a suitable dielectric material such as plastic or ceramics, is formed and dimensioned in such a way in the antenna area that radome properties are ensured. Preferably, the special forming is directed into the housing. This yields the smallest possible volume for the device. This is possible since compartments for HF circuits locally next to the antennas require a certain height, which is then available in the antenna area to the antennas themselves as usable volume. The existing cover 15 of the system, made of a suitable dielectric material such as plastic or ceramics, is shaped in the antenna area into the device interior, i.e., into openings 6, that is, has at least one projection 51 (FIGS. 18 and 19), such that the air space extends up to the outer patch surface, or even projects through the patch cut-out. Further improved antenna properties can be attained with insignificant additional expenditure. Stacked patch antennas may easily be realized in combination with the inverse patch arrays indicated above and the previously described metal patch attachment (inject or clip stack patches 21 into cover 15) (FIGS. 20 through 22). The dimensions and shapes of the stacked patches may be the same or different.

In the further course of the antenna axis, cut-outs 6 in mounting/housing part 3 may again have familiar funnel or horn antenna shapes. Alternatively, the conductive housing is not the accommodation of the complete conductor substrate, but rather on its part, is applied so that it is positioned only partially on the substrate. In this case, a further part is needed as housing.

In a further embodiment variant, an arrangement of N slot structures can be provided on the surface of the ceramics, by way of substitution printed circuit board or multi-layer composite materials, which feed an array of M patches attached to a cover housing. For example, four metal patch platelets are situated centrally at a constant height above the four coupling slots in the LTCC substrate or organic multi-layer substrate.

The first advantage is that a narrow coupling network can be created on a planar substrate that feeds a system of spatially distant structures which have a larger aperture.

By selective utilization of an odd-numbered arrangement of feeding elements with a larger odd number of patches, it is possible to produce the desired radiation pattern with a wider lobe and a maximum perpendicular to the surface, if no phase shift is set between the element currents. A system having an even number of feeding elements and a larger even number of patches leads to an even wider lobe, however with a slight minimum in the perpendicular direction to the surface. If one selects this feed at maximally 3 dB, it is possible to enlarge the opening angle up to 20% compared to the last design approach.

It is possible to consertedly improve the side lobe attenuation by the arrangement of even/uneven or uneven/even number of feeding elements/patches.

Until now, a constant distance of patches and coupling elements (coupling slots) was always assumed. However, the distance may also be selected to increase or decrease symmetrically, in each case separately for feeding elements or patches. It is thereby possible to set the coupling factors more finely, and to attain additional directional diagram properties such as improved side lobe attenuation or beam expansion through small feeds.

Likewise, a predefined power distribution (tapering) to the feeding elements and patches may be achieved by altering the coupling coefficients.

Figure 24:
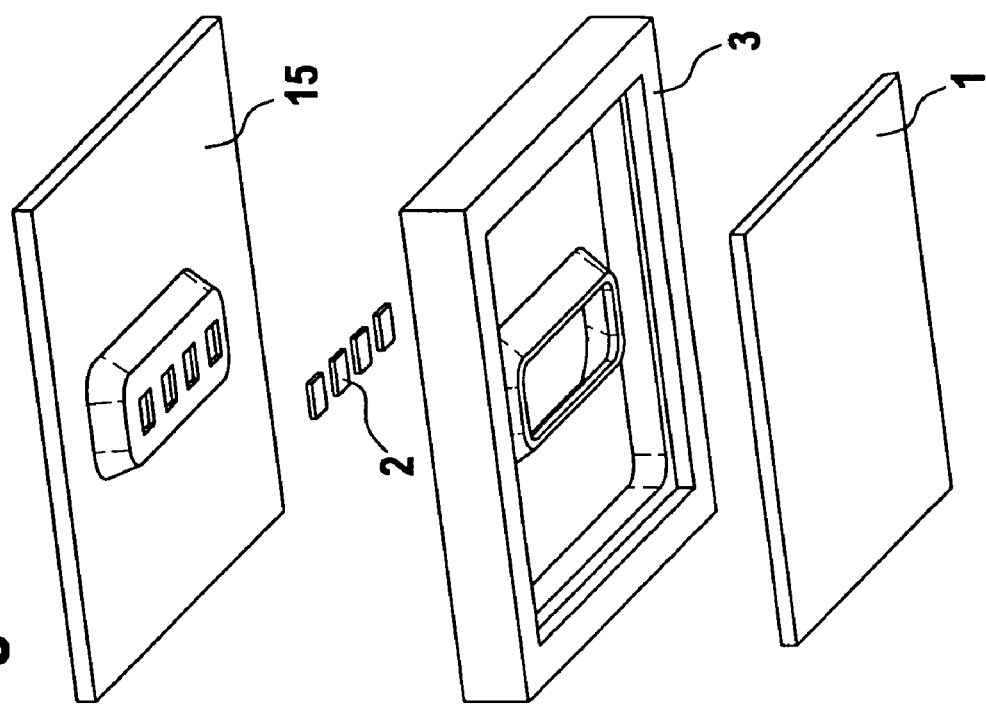
FIGS. 23 to 25 shows an antenna system having centrally-arranged patches over coupling slots.
Figure 23:
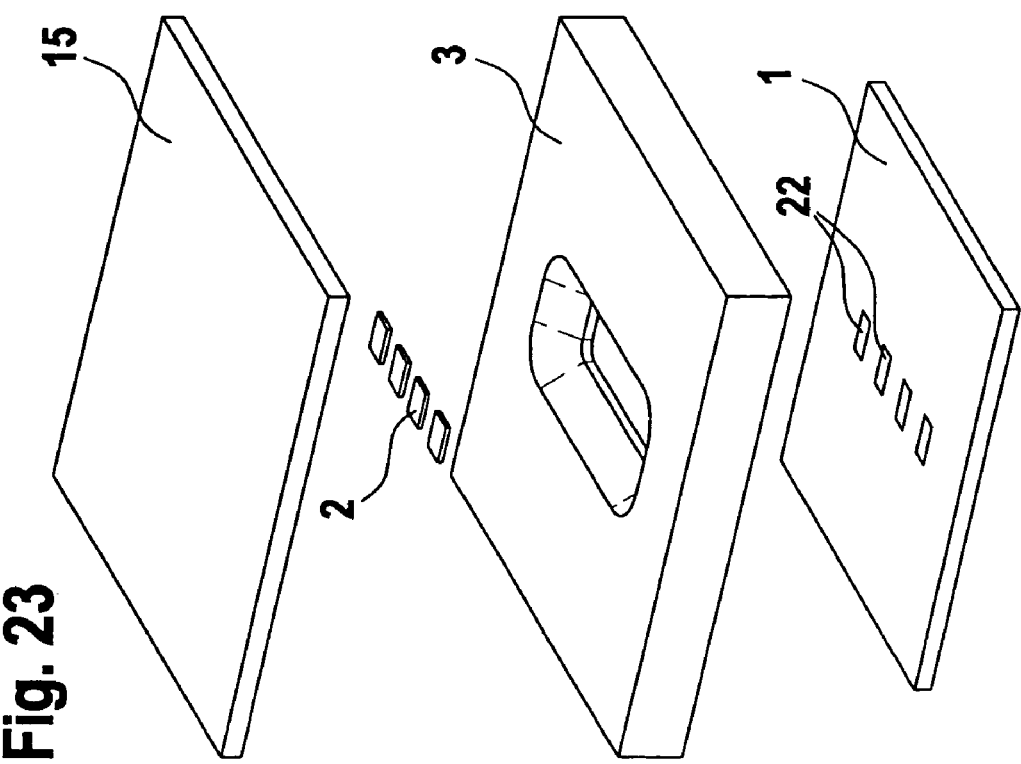
Figure 25:
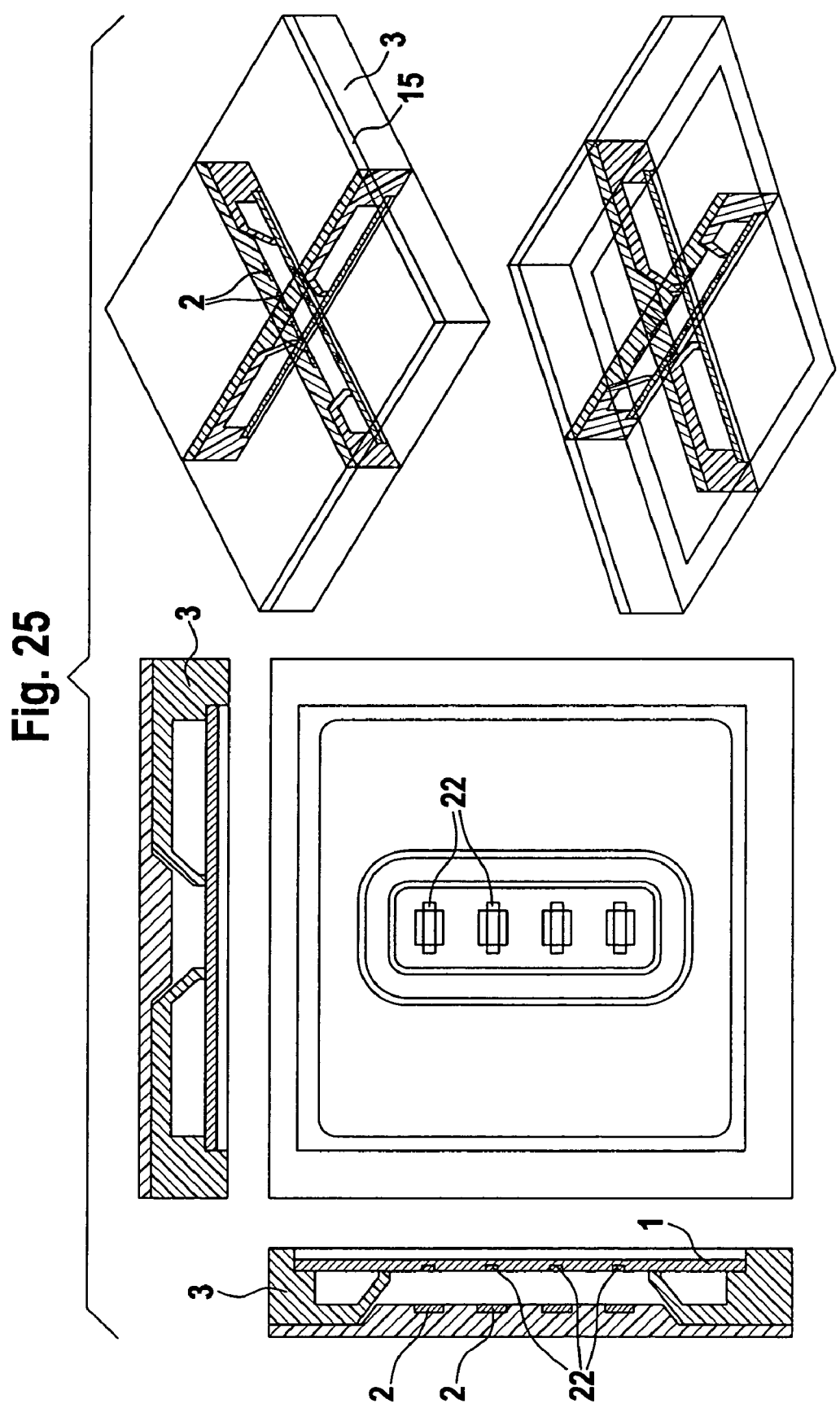
Figure 26:
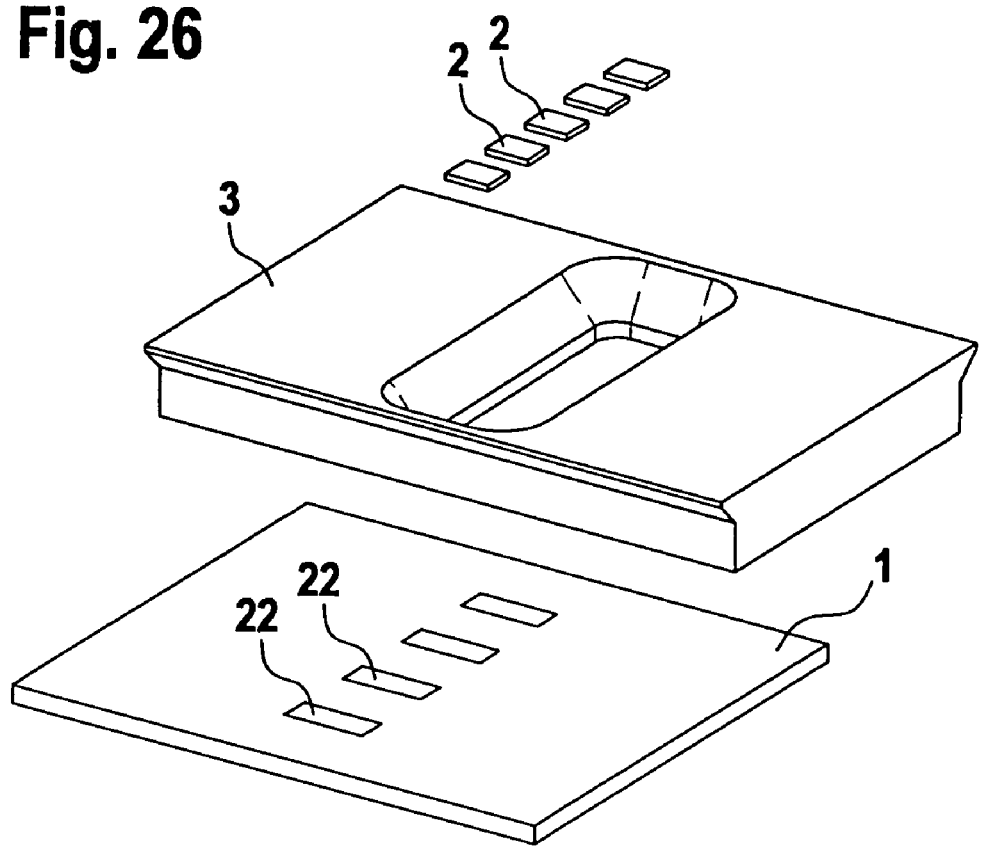
FIGS. 26 to 28 shows an antenna system having different distances between coupling slots on one hand and patches on the other hand.
Figure 27:
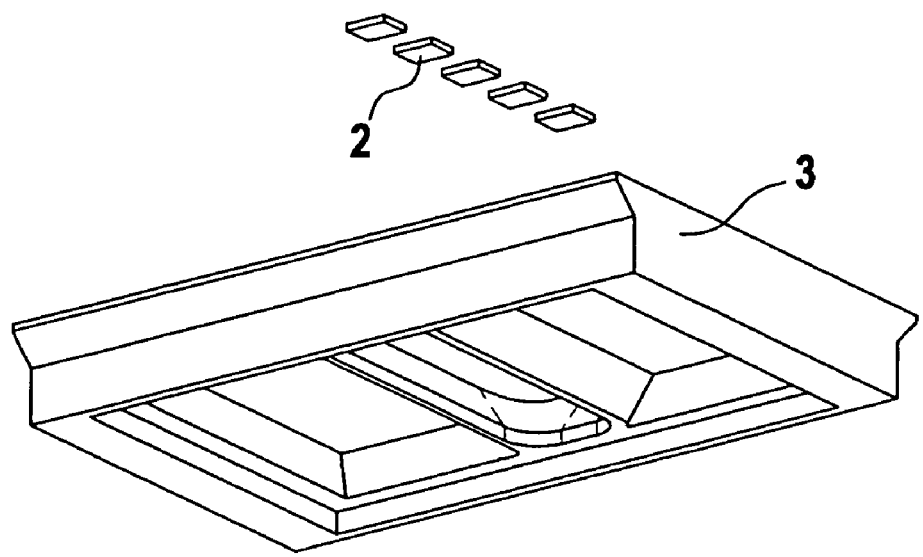
Figure 28:
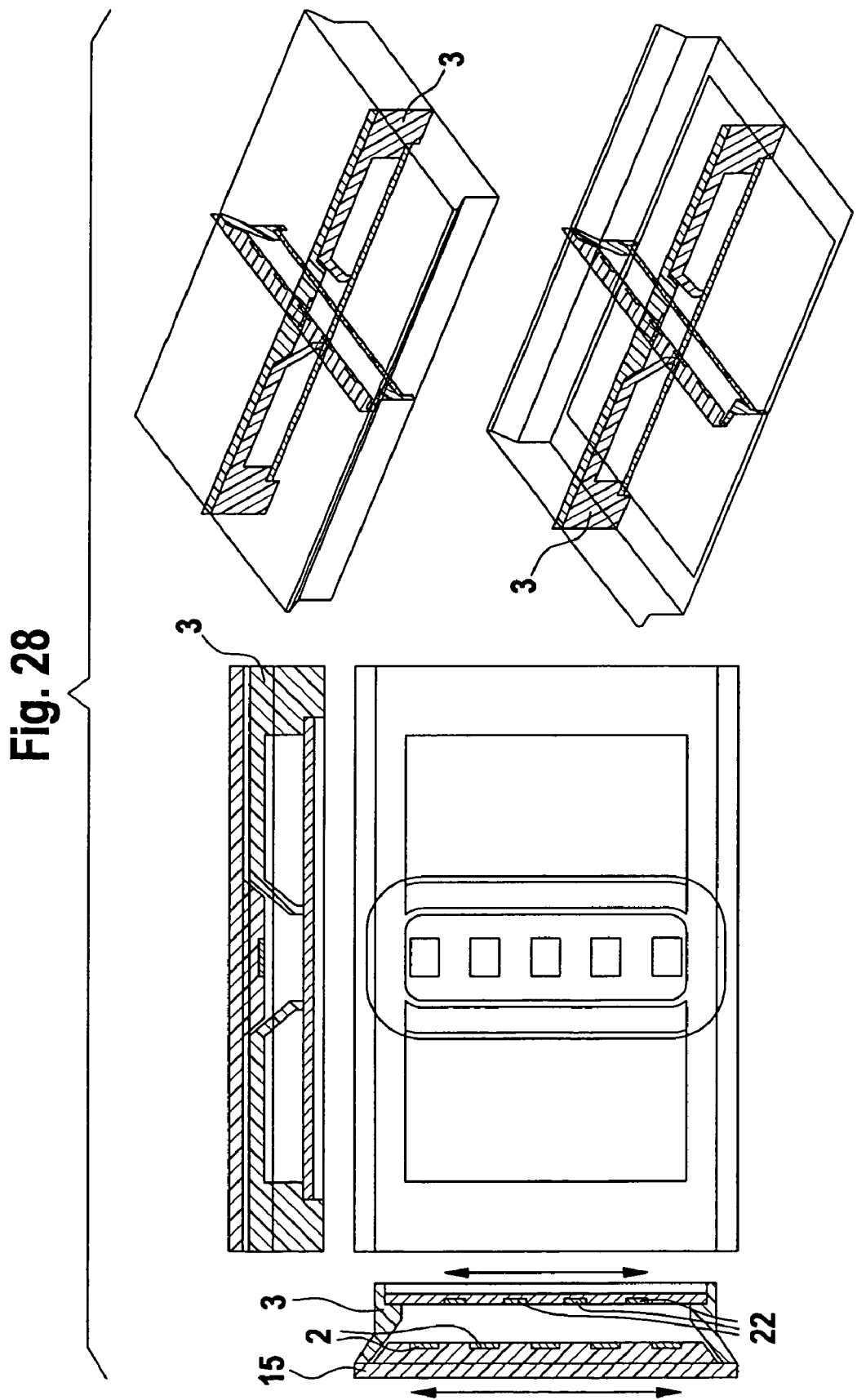

If mechanical reasons or production reasons point in its favor, coupling networks may be densely packed and, to that end, fewer patches used (N>M); Example: patches that are too large in the radome fed through small-structured slots. FIGS. 23 through 25 show a system having four centrally-situated patches over corresponding coupling slots 22 on antenna feeding substrate 1. In the variant according to FIGS. 26 through 28, M patches 2 are disposed above N coupling slots 22, equal distances being maintained between the coupling slots, and different or equal distances being maintained in the case of patches 2. In the variant shown, N=5 equidistant patches 2 are depicted in the radome over M=4 equidistant coupling slots 22 on antenna feeding substrate 1. With increased number of transmitting patches 2, one obtains dimensionally longer antennas with greater range, as is otherwise not possible through the substrate dimension alone, i.e., the substrate dimension may be selected to be smaller than usual. Compared to the first variant, in the variant according to FIGS. 29 through 31, the distances are set—separately for coupling slots 22 and patches 2—so that they change in a manner that they increase or decrease symmetrically to the outside. M and N are natural numbers, where preferably M>N.

Figure 32:
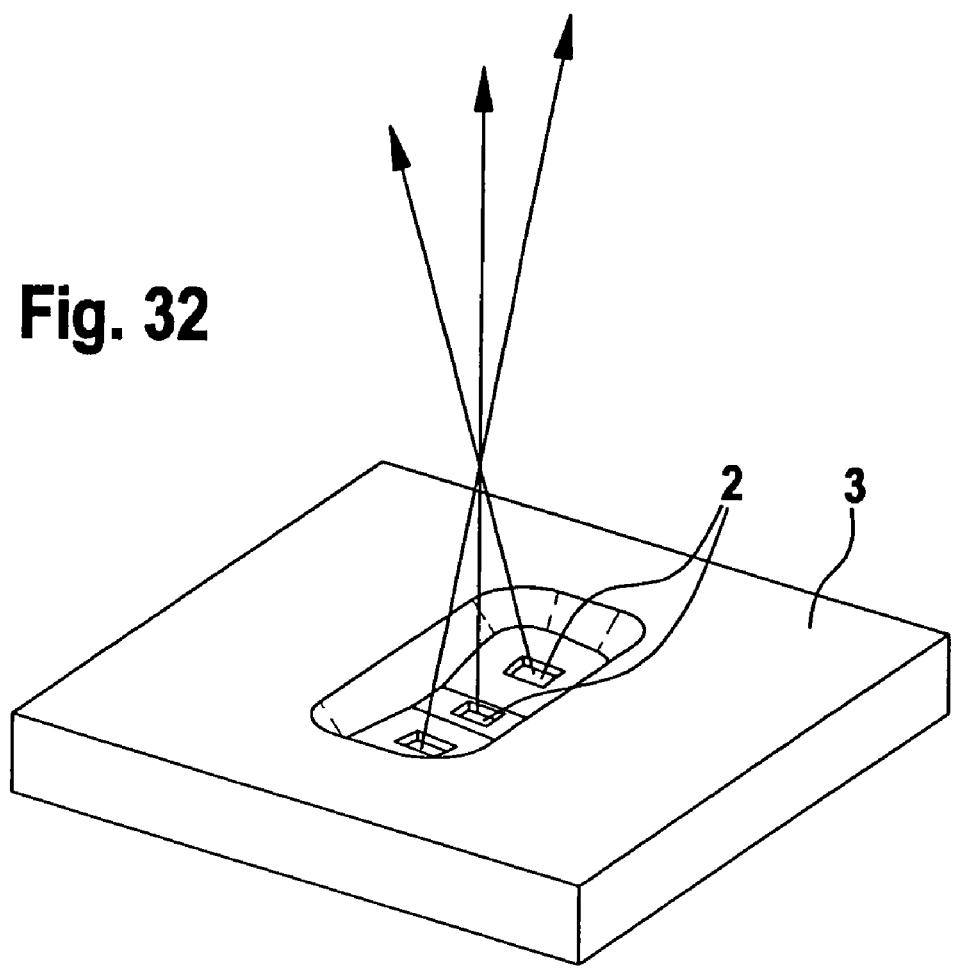
Figure 33:
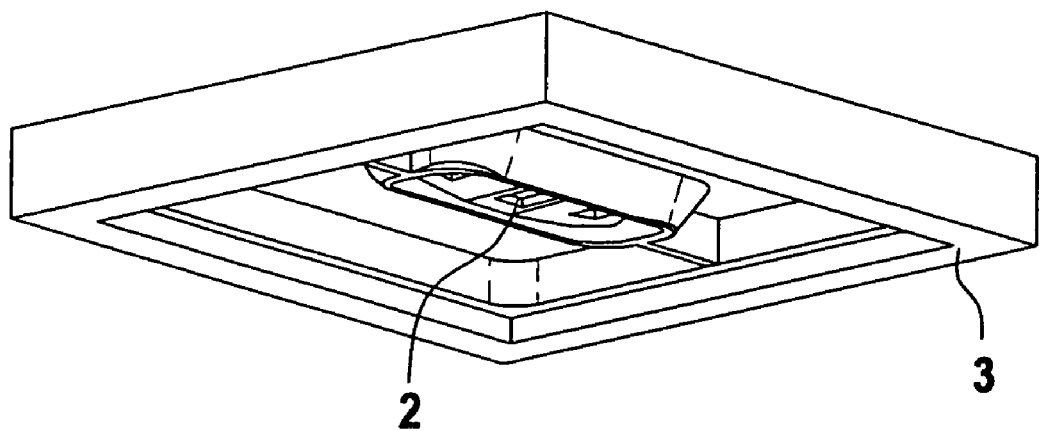

In the exemplary embodiments introduced until now—like, for example, four patches 2 each at a constant height above coupling slots 22 of antenna feeding substrate 1 (LTCC circuit or organic multilayer substrate) and feeding with equal power and phase—side lobe radiation which is unnecessarily high and an antenna diagram which is not optimal may result. This disadvantage can be overcome if at least two planar antenna radiating elements 2 and/or inverse, planar antenna radiating elements are inclined relative to each other with respect to their surface normals. FIGS. 32 and 33 show a variant relating to this, having, for example, 3 complementary (inverse) patches 2 (slot antennas) which are inclined inwards. To this end, the base of indentation 6 of mounting part 3 is divided into three areas inclined relative to each other, in which slots are provided in each case. Due to the different coupling coefficients, caused by different heights in the Z direction, a greater side lobe attenuation can be produced. For a wide lobe, on the other hand, patches 2 may be inclined outwards in divergent fashion. A rotation of the surface normal about the Y axis induces a beam swing, away from the normal. The rotation may also be unequal for individual patches 2. Upper cover 23 is used as a radome and has no electrical function.

To increase the bandwidth and to utilize a larger aperture (greater antenna gain), it is advantageous to give radome 23 an electrical focusing, similar to known dielectric lenses. The effect is even amplified if electrical radiator structures are additionally mounted on the radome. This may be accomplished by injection, pressing in or electroplating.

Figure 30:
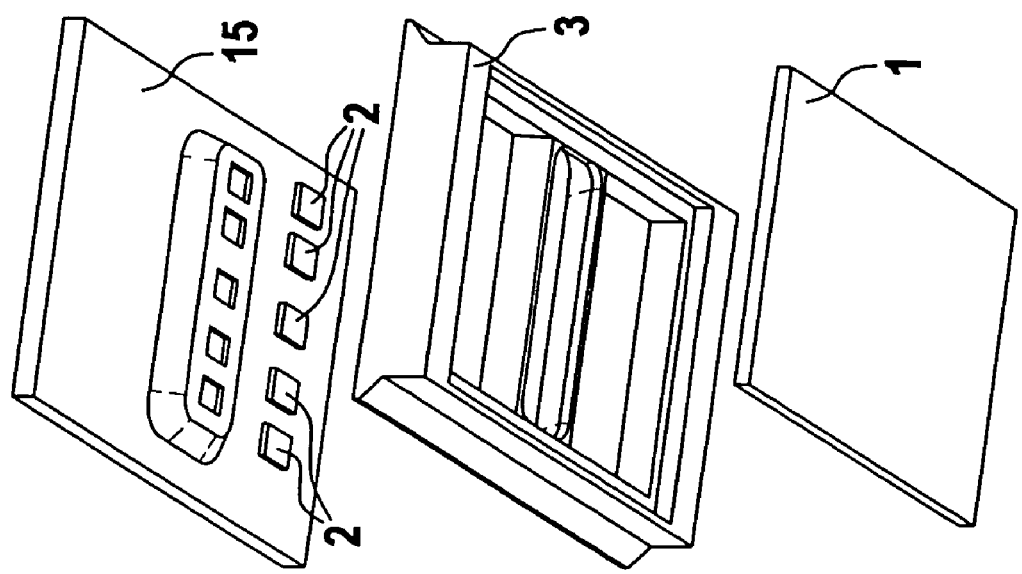
FIGS. 29 to 31 shows an antenna system having different distances between the coupling slots and between the patches.
Figure 29:
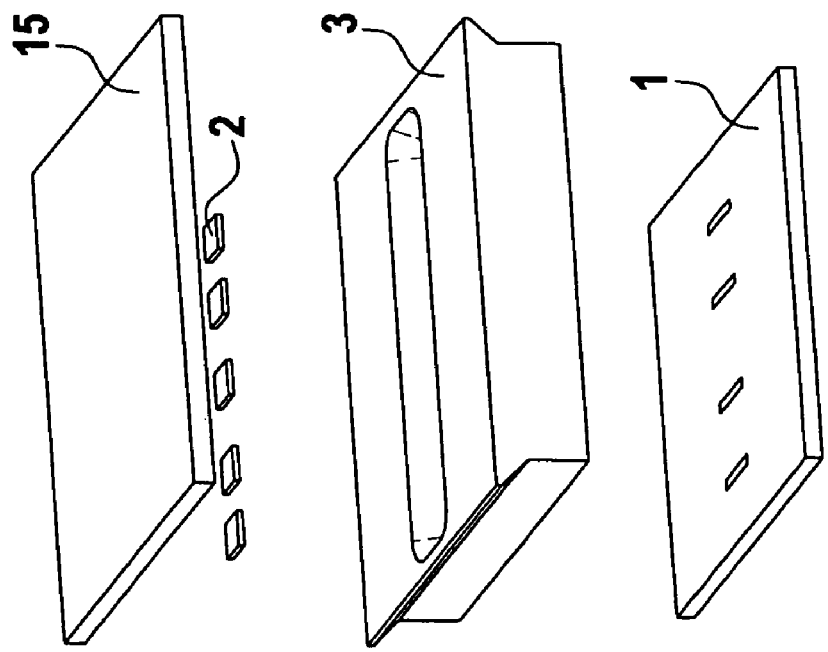
Figure 31:
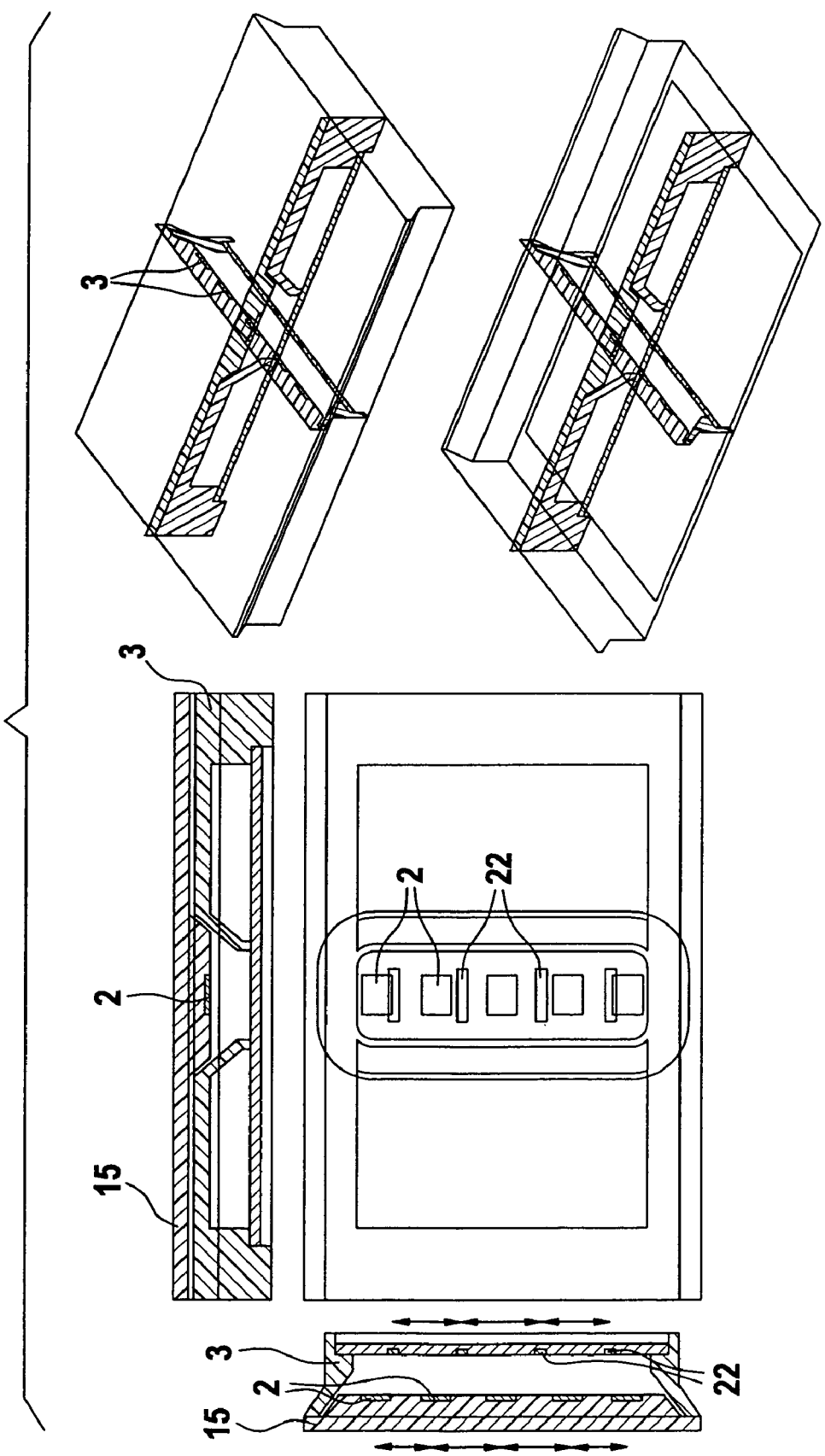

If more patches are applied to the radome than coupling slots, a supply circuit which can be small-dimensioned is able to illuminate a much larger area (to this end, cf. the embodiment variants according to FIGS. 29 through 31). The additional advantages as described before, e.g., utilization of an odd-numbered arrangement of feeding elements with a larger odd number of patches, as well as the distance variation in the Z direction, may likewise be achieved. In addition, the patches may also be tilted about the Y axis for the beam deflection. A notched or stepped form of the radome is likewise able to be produced. A continuous contour is often required for reasons of production engineering. A tapering may be provided, as well. Arrangements such as nonuniform distances of the coupling slots, nonuniform distances of the patches, arrangement of several columns having elements optimized per se on continuous or notched contours, as well as N feeding elements with M coupling slots, and the fact of a tilted radome arrangement may, of course, be produced individually or in combination within the intention of this invention, as well.

In the following, a few of the variants previously pointed out are clarified with the aid of drawings.

Figure 36:
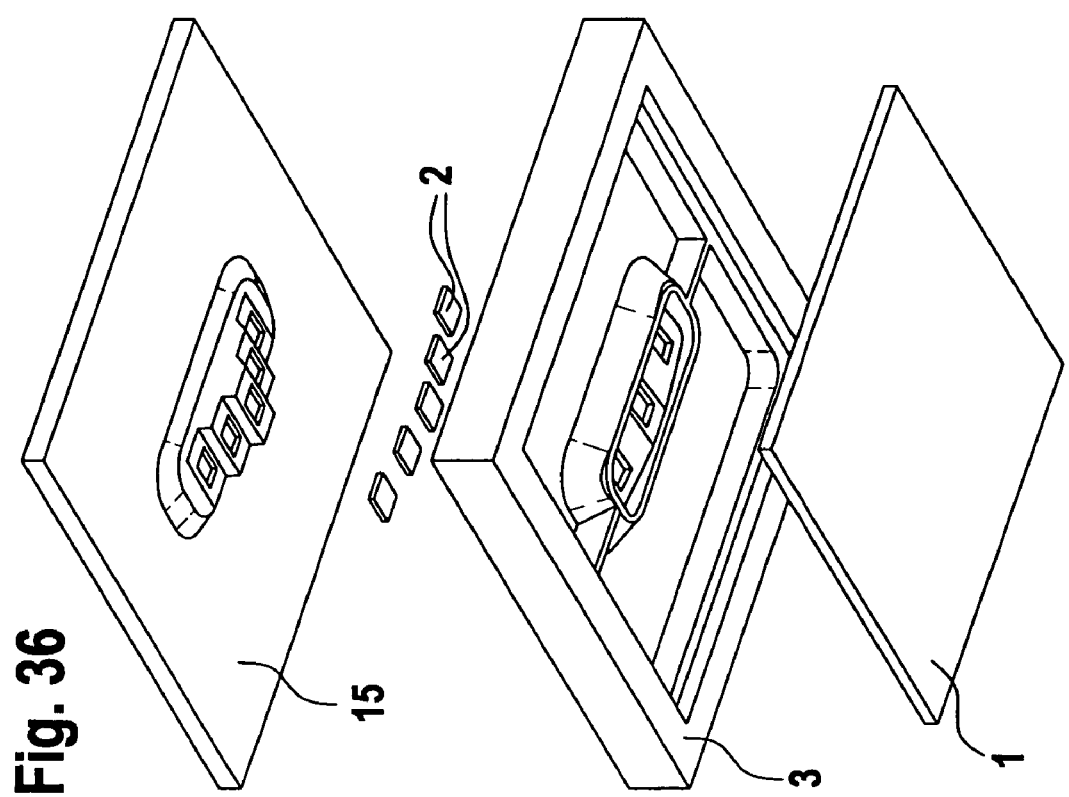
FIGS. 35 to 37 shows an antenna system having inverse patches inclined relatively to each other and standard patches in the radome.
Figure 35:
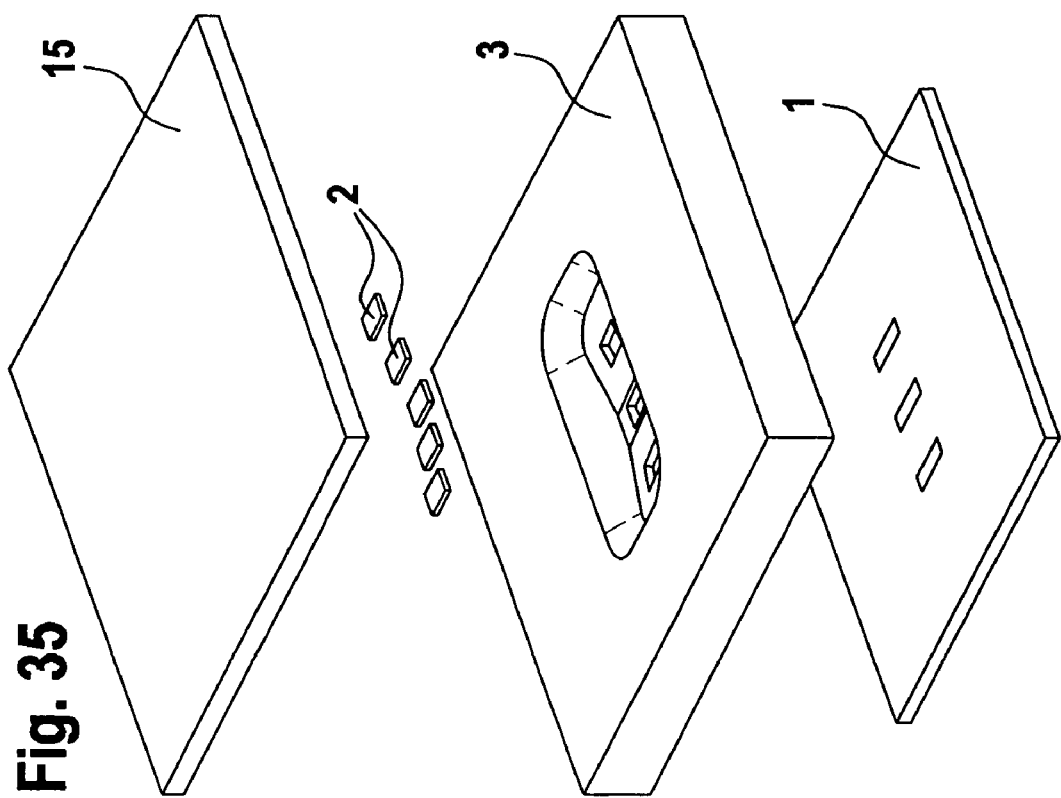
Figure 37:
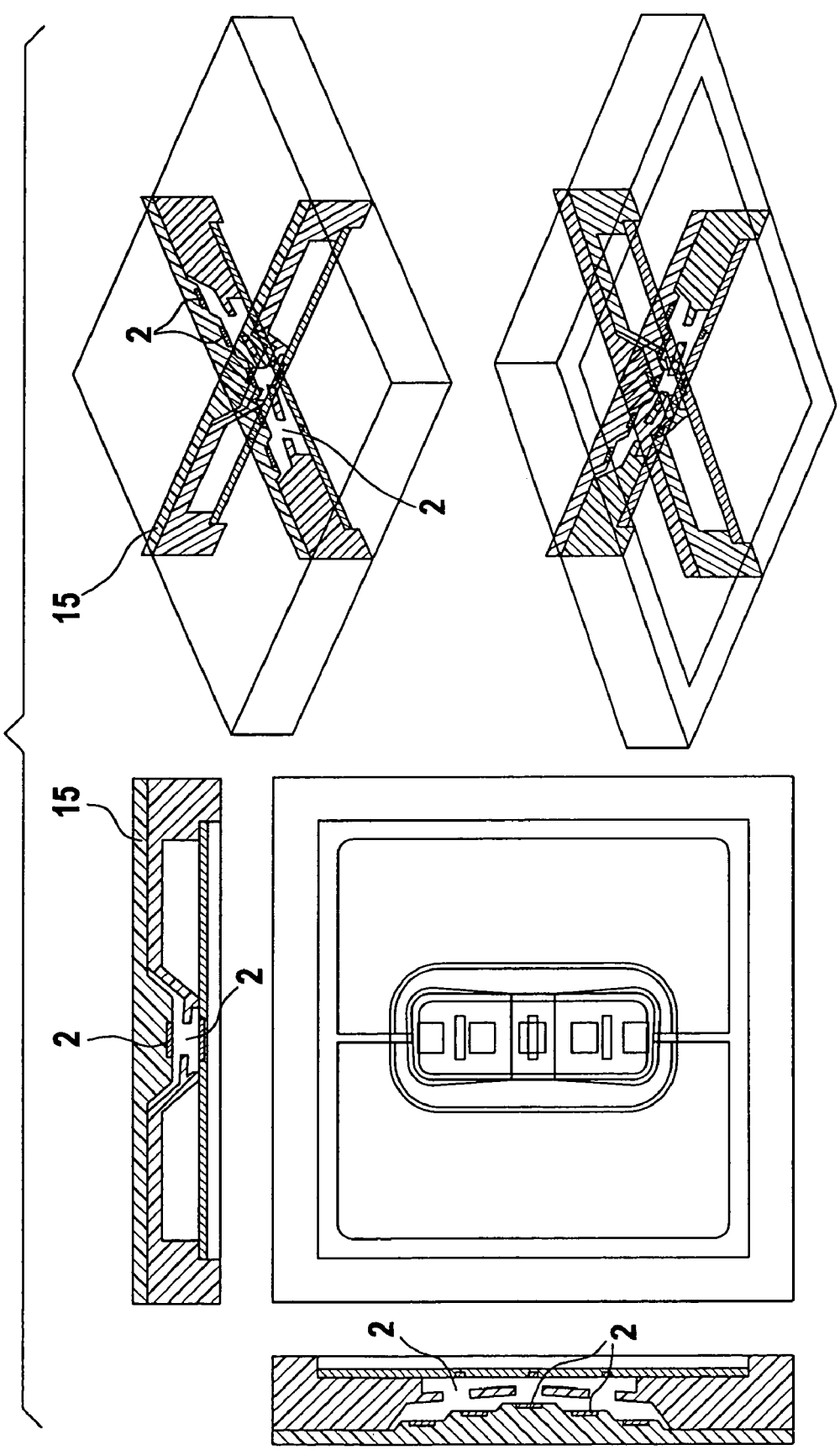

FIGS. 32, 33 and 34 show a system having inverse patches 2, in which the surface normals are rotated inwards. Naturally, systems rotated outwards may also be provided. The heights may also include positive or negative steps. To set a certain preferential direction, the inverse patches may also be rotated about the Y axis (FIG. 34, above left). The depiction is based on one column having 3, 4 or 5 patches; however, patch arrays having a number of columns other than 1 may also be assembled, e.g., 6×4 elements with a continuous, inner, curved surface. In elaboration of the previous, in FIGS. 35 through 37, in addition to the inverse patches, further normal patches 2 are held in the radome material. The result is an antenna system having a wider bandwidth capability. In addition, the number of slots (inverse patches) and normal patches is different.

As before, the M patches are now fed through N coupling slots on a level, HF-suitable printed circuit board made, for instance, of organic material or ceramic substance such as LTCC (antenna feeding substrate 1). The Z distances of patches 2 increase symmetrically outwards. The patches may also rest on a notched boundary curve and be tilted in the X and/or Y direction. Naturally, the system may also be implemented in several different columns. Depending on the beam shaping desired, the Z distances may also decrease symmetrically outwards. Continuous contours are often preferred for production reasons.

Usage possibilities for the exemplary embodiments presented above preferably arise in automotive engineering such as radar distance measuring, ACC (automatic cruise control), parking aid, vehicle-vehicle communication, tire-pressure transmission engine-data transmission. An application in electric tools, e.g., for detecting lines, is likewise possible. The use is usually limited to frequencies above 1 GHz.

What is claimed is:

1. An antenna system for a radar application in a motor vehicle, comprising:
    an antenna feeding substrate having conductor structures for field coupling to at least one planar antenna radiating element; and
    a mounting part, able to be fixed in position against the antenna feeding substrate, for the at least one planar antenna radiating element, one of the mounting part and a housing part able to be joined to the at least one planar antenna radiating element with form locking being provided for an HF-shielding of the antenna feeding substrate;
    wherein:
        at least one of the mounting part and the housing part is structured in such a way that, viewed from the at least one planar antenna radiating element in a radiation direction, a wave guidance is achieved; and
        the housing part includes bars in a direction of the antenna feeding substrate for forming HF compartments over the antenna feeding substrate.

2. The antenna system as recited in claim 1, wherein the at least one planar antenna radiating element is applied on at least one side of a dielectric substrate.

3. The antenna system as recited in claim 2, wherein the housing part includes at least one cut-out for introducing one of the at least one planar antenna radiating element and the dielectric substrate.

4. The antenna system as recited in claim 2, wherein a distance between the antenna feeding substrate and one of the at least one planar antenna radiating element and the dielectric substrate is less than one fourth an operating wavelength.

5. The antenna system as recited in claim 2, wherein a distance between the antenna feeding substrate and one of the at least one planar antenna radiating element and the dielectric substrate is 0.02 to approximately 0.1 of an operating wavelength.

6. The antenna system as recited in claim 1, wherein in a region of the at least one planar antenna radiating element, a housing part includes at least one opening in a direction of the antenna feeding substrate, and a transition from a bottom/end of the at least one opening to an outside of the housing part is designed to be one of horn-shaped and funnel-shaped.

7. The antenna system as recited in claim 1, wherein the mounting part itself forms the housing part.

8. The antenna system as recited in claim 1, wherein one of the mounting part and the housing part includes an outer cover made of a dielectric material that is formed and dimensioned in such a way that the outer cover can be used as one of a radome and a superstrate.

9. The antenna system as recited in claim 8, wherein the outer cover, in a region of a cut-out, has at least one projection that engages with form locking in an opening.

10. The antenna system as recited in claim 9, wherein in the case of complementary planar antenna radiating elements, the at least one projection protrudes through the cut-out.

11. An antenna system for a radar application in a motor vehicle, comprising:
an antenna feeding substrate having conductor structures for field coupling to at least one planar antenna radiating element; and
a mounting part, able to be fixed in position against the antenna feeding substrate, for the at least one planar antenna radiating element, one of the mounting part and a housing part able to be joined to the at least one planar antenna radiating element with form locking being provided for an HF-shielding of the antenna feeding substrate;
wherein:
at least one of the mounting part and the housing part is structured in such a way that, viewed from the at least one planar antenna radiating element in a radiation direction, a wave guidance is achieved;
one of the mounting part and the housing part includes an outer cover made of a dielectric material that is formed and dimensioned in such a way that the outer cover can be used as one of a radome and a superstrate;
the outer cover, in a region of a cut-out, has at least one projection that engages with form locking in an opening;
in the case of complementary planar antenna radiating elements, the at least one projection protrudes through the cut-out; and
the at least one planar antenna radiating element is embedded by being injected into the mounting part.

12. An antenna system for a radar application in a motor vehicle, comprising:
an antenna feeding substrate having conductor structures for field coupling to at least one planar antenna radiating element; and
a mounting part, able to be fixed in position against the antenna feeding substrate, for the at least one planar antenna radiating element, one of the mounting part and a housing part able to be joined to the at least one planar antenna radiating element with form locking being provided for an HF-shielding of the antenna feeding substrate;
wherein:
at least one of the mounting part and the housing part is structured in such a way that, viewed from the at least one planar antenna radiating element in a radiation direction, a wave guidance is achieved; and
the at least one planar antenna radiating element is incorporated into a dielectric functional part that is insertable, with form locking, into an opening of one of the mounting part and the housing part.

13. The antenna system as recited in claim 1, wherein the mounting part has snap-in locking elements for introducing and fixing the at least one planar antenna radiating element in position.

14. The antenna system as recited in claim 1, wherein M antenna radiating elements are provided, and N associated coupling slots in the antenna feeding substrate for the field coupling, M and N being natural numbers, and M being greater than N.

15. The antenna system as recited in claim 14, wherein different distances are provided between the coupling slots and/or the antenna radiating elements.

16. An antenna system for a radar application in a motor vehicle, comprising:
an antenna feeding substrate having conductor structures for field coupling to at least one planar antenna radiating element; and
a mounting part, able to be fixed in position against the antenna feeding substrate, for the at least one planar antenna radiating element, one of the mounting part and a housing part able to be joined to the at least one planar antenna radiating element with form locking being provided for an HF-shielding of the antenna feeding substrate;
wherein:
at least one of the mounting part and the housing part is structured in such a way that, viewed from the at least one planar antenna radiating element in a radiation direction, a wave guidance is achieved; and
at least two antenna radiating elements are provided, stacked one above the other, at least one of the antenna radiating elements in particular being incorporated into a dielectric functional part or a radome.

17. The antenna system as recited in claim 16, wherein at least two planar antenna radiating elements and/or inverse, planar antenna radiating elements are inclined relative to each other with respect to their surface normals.

18. An antenna system for a radar application in a motor vehicle, comprising:
an antenna feeding substrate having conductor structures for field coupling to at least one planar antenna radiating element; and
a mounting part, able to be fixed in position against the antenna feeding substrate, for the at least one planar antenna radiating element, one of the mounting part and a housing part able to be joined to the at least one planar antenna radiating element with form locking being provided for an HF-shielding of the antenna feeding substrate;
wherein:
at least one of the mounting part and the housing part is structured in such a way that, viewed from the at least one planar antenna radiating element in a radiation direction, a wave guidance is achieved; and both planar antenna radiating elements and inverse, planar antenna radiating elements are provided, the inverse, planar antenna radiating elements being inclined relative to each other with respect to their surface normals.

19. The antenna system as recited in claim 18, wherein the number of planar antenna radiating elements differs from the number of inverse, planar antenna radiating elements.

20. The antenna system as recited in claim 18, wherein the inverse, planar antenna radiating elements are situated in the mounting part, and the planar antenna radiating elements in a cover.

21. The antenna system as recited in claim 11, wherein the cut-out forms a slot antenna.

* * * * *